(12) United States Patent
Ohran

(10) Patent No.: US 7,296,125 B2
(45) Date of Patent: Nov. 13, 2007

(54) PRESERVING A SNAPSHOT OF SELECTED DATA OF A MASS STORAGE SYSTEM

(75) Inventor: Richard S. Ohran, Henderson, NV (US)

(73) Assignee: EMC Corporation, Hopkinton, MA (US)

(*) Notice: Subject to any disclaimer, the term of this patent is extended or adjusted under 35 U.S.C. 154(b) by 762 days.

(21) Appl. No.: 09/997,643

(22) Filed: Nov. 29, 2001

(65) Prior Publication Data

US 2003/0101321 A1    May 29, 2003

(51) Int. Cl.
*G06F 12/00*    (2006.01)

(52) U.S. Cl. .................. 711/162; 707/204; 714/15; 714/20

(58) Field of Classification Search ............ 711/100, 711/111, 112, 153, 156, 161, 162, 170, 73; 707/204; 714/15, 20
See application file for complete search history.

(56) References Cited

U.S. PATENT DOCUMENTS

| | | | |
|---|---|---|---|
| 4,467,421 A | 8/1984 | White .................. | 364/200 |
| 5,038,278 A | 8/1991 | Steely, Jr. et al. .......... | 364/200 |
| 5,086,502 A | 2/1992 | Malcolm .................. | 395/575 |
| 5,089,958 A | 2/1992 | Horton et al. .............. | 395/575 |
| 5,157,663 A | 10/1992 | Major et al. ................ | 371/9.1 |
| 5,163,148 A | 11/1992 | Walls ....................... | 395/600 |
| 5,241,668 A | 8/1993 | Eastridge et al. ........... | 395/575 |
| 5,241,669 A | 8/1993 | Cohn et al. ................ | 395/575 |
| 5,241,670 A | 8/1993 | Eastridge et al. ........... | 395/575 |
| 5,263,154 A | 11/1993 | Eastridge et al. ........... | 395/575 |
| 5,349,655 A | 9/1994 | Mann ....................... | 395/575 |
| 5,375,232 A | 12/1994 | Legvold et al. ............. | 395/575 |
| 5,379,398 A | 1/1995 | Cohn et al. ................ | 395/425 |
| 5,379,412 A | 1/1995 | Eastridge et al. ........... | 395/575 |
| 5,403,639 A | 4/1995 | Belsan et al. .............. | 395/600 |
| 5,410,667 A | 4/1995 | Belsan et al. .............. | 395/425 |
| 5,414,850 A | 5/1995 | Whiting .................... | 395/700 |
| 5,426,747 A | 6/1995 | Weinreb et al. ............ | 395/400 |
| 5,435,004 A | 7/1995 | Cox et al. .................. | 395/575 |
| 5,448,718 A | 9/1995 | Cohn et al. ................ | 395/404 |

(Continued)

OTHER PUBLICATIONS

IBM Corp, IBM Technical Disclosure Bulletin, *Storage Management Mechanism for Managing Snapshot Pages*, pp. 26-29, Sep. 1992, author unknown.

(Continued)

*Primary Examiner*—Brian R. Peugh
*Assistant Examiner*—Matthew Bradley
(74) *Attorney, Agent, or Firm*—Workman Nydegger

(57) ABSTRACT

Maintaining logically consistent backups using minimal data transfer. A backup, or snapshot, copy of original data is created and stored. A user designates data blocks that are to be backed up in a process of creating a subsequent snapshot copy of the data. Data blocks that are to be backed up might include those associated with active files having data of interest to the user. Data blocks that are not desired for backup might include, for example, swap files, printer buffers and temp files. The changes that have been made to the data blocks that have been designated for backup are applied to the snapshot copy after a specified time period has elapsed. Since only desired data blocks are backed up to the snapshot copy, memory, processing cycles and communication bandwidth are used more efficiently than if all data blocks were to be backed up to the snapshot copy.

28 Claims, 10 Drawing Sheets

U.S. PATENT DOCUMENTS

| | | |
|---|---|---|
| 5,455,932 A | 10/1995 | Major et al. ................. 395/489 |
| 5,515,502 A | 5/1996 | Wood .................... 395/182.13 |
| 5,546,534 A | 8/1996 | Malcolm ............... 395/182.04 |
| 5,649,152 A | 7/1997 | Ohran et al. ................. 395/441 |
| 5,649,196 A | 7/1997 | Woodhill et al. ........... 395/620 |
| 5,664,186 A | 9/1997 | Bennett et al. ............. 395/620 |
| 5,719,889 A | 2/1998 | Iadanza ..................... 371/49.3 |
| 5,790,773 A | 8/1998 | DeKoning et al. |
| 5,819,020 A | 10/1998 | Beeler, Jr. ............... 395/182.03 |
| 5,835,953 A | 11/1998 | Ohran ........................ 711/162 |
| 6,073,222 A | 6/2000 | Ohran ........................ 711/162 |
| 6,081,875 A | 6/2000 | Clifton et al. |
| 6,085,298 A | 7/2000 | Ohran ........................ 711/162 |
| 6,101,585 A | 8/2000 | Brown et al. |
| 6,131,148 A | 10/2000 | West et al. |
| 6,205,527 B1 * | 3/2001 | Goshey et al. .............. 711/162 |
| 6,332,177 B1 | 12/2001 | Humlicek |
| 6,397,229 B1 * | 5/2002 | Menon et al. .............. 707/204 |
| 6,434,681 B1 * | 8/2002 | Armangau ................... 711/162 |
| 6,618,794 B1 * | 9/2003 | Sicola et al. ................. 711/154 |
| 6,625,623 B1 * | 9/2003 | Midgley et al. ............. 707/204 |
| 6,665,779 B1 * | 12/2003 | Berhan et al. .............. 711/162 |
| 6,678,809 B1 * | 1/2004 | Delaney et al. ............. 711/162 |
| 6,681,303 B1 * | 1/2004 | Watanabe et al. ........... 711/162 |

OTHER PUBLICATIONS

VERITAS Software Corp., *VERITAS Filed System (VxFS) System Administrator's Guide*, circa Feb. 1992, author unknown.

Sale of VERITAS File System (VxFS) Software, circa 1992, sold by VERITAS Software Corporation.

* cited by examiner

PRESERVING A SNAPSHOT OF SELECTED DATA OF A MASS STORAGE SYSTEM

BACKGROUND OF THE INVENTION

1. The Field of the Invention

The present invention relates to the protection of computer data, and more particularly to a system and method for taking a snapshot copy of only certain sectors on one or more mass storage systems.

2. Background and Related Art

Computers have become an integral part of most business operations. In some instances, computers have become so vital that when they cease to function, business operations cannot be conducted. Banks, insurance companies, brokerage firms, financial service providers, and a variety of other businesses rely on computer networks to store, manipulate, and display information that is constantly subject to change. The success or failure of a transaction may turn on the availability of information which is both accurate and current The credibility of the service provider, or its very existence, may depend on the reliability of the information maintained on a computer network. Businesses worldwide recognize the commercial value of their data and are seeking reliable, cost-effective ways to protect the information stored on their computer networks by reliably backing up data.

Often, files such as swap files, printer buffers, free sector tables and "temp" files are backed up even though those files are typically not desired to be backed up. Backing up of unwanted files causes wasted processing cycles, communication bandwidth and backup memory capacity. To avoid backing up unwanted information, systems have been developed whereby individual files may be selected for backup. These systems operate (1) by adding a software layer to intercept all file system commands and (2) by defining two types of files: tracked and untracked. For tracked files, the system provides both a backup version and an update version of the file. The backup version is the file as it existed at the time a backup is initiated; the update version is a current version of the file, including any modifications made after a backup has been initiated. For untracked files, only a current (or update) version is available. Essentially, the system functions as if a software layer were present to intercept file system commands.

The software layer provides a backup and update version of a file by storing file modifications such that they do not overwrite the original file data as it existed when a backup is initiated. By intercepting all file system commands, the system can provide the appropriate version of the file to a program requesting access. For example, when the backup program makes a read request, the software layer provides the backup version of the data requested. Other programs making read requests receive the update version of the file data.

The software layer intercepting all file system commands is an adequate solution when only a few files are tracked. However, the solution proves unworkable as the number of tracked files increases. The problem is that the software layer essentially performs the work of a file system. For tracked files, each file operation performed by operating system is also performed, in one form or another, by the software layer. With an increasing number of files, the software layer becomes overloaded and degrades performance such that the system is unusable.

The software interception layer also overlooks the relationships that may exist between files. As described above, it is not enough that the data stored within a file is consistent. The data stored in one file is likely related to data stored in one or more other files. The prior art's software layer is only able to insure that a file is accessible during a backup process. It makes no provision for insuring a logically consistent set of data across all files comprising a backup operation. Therefore, backups made with a software layer of this type may be less beneficial due to inconsistencies in the stored data.

It would, therefore, represent an advancement in the art to have an efficient system for backing up only data that is desired to be backed up while maintaining relationships between files.

BRIEF SUMMARY OF THE INVENTION

The above mentioned problems in the prior state of the art have been successfully overcome by the present invention, which is directed to a system and method for backing up original data to a snapshot copy of that data for only those data blocks that are desired to be protected. The current system and method provides four significant advantages over the prior art. First, the backup system and method of the present invention reduces the amount of data needed to make a backup by backing up only those data blocks of the primary mass storage device that changed and have been designated as desirable files for backup. Second, the system and method of the present invention provides for a more efficient use of the storage area since the amount of data for backup is reduced to the absolute minimum through backing up only that which is desirable to back up. Third, the system and method of the present invention emphasizes accuracy of the backup by ensuring that the primary storage device is in a logically consistent state when a backup is made. Fourth, because the data needed to make a backup is reduced to the absolute minimum, and because backups are only made of logically consistent states, backup frequency can be increased.

The method of the present invention begins with the assumption that the original data and a snapshot copy of that data contain identical data, at least with regard to the data blocks designated for backup. This may be accomplished, for example, by making a complete copy of the original data to the snapshot copy using either traditional backup techniques or traditional disk mirroring techniques. Once the original data and the snapshot copy contain the same data, the present invention creates a map or another data structure for listing all data blocks that have been altered, tracks the changes made to the data blocks on the primary mass storage device, identifies the altered data blocks, and designates the data blocks desired for backup from those data blocks that that are not desired for backup. The tracking is done by identifying those storage locations in the original data that have new data written in them from the time that the snapshot copy was in sync with the original data. The identification of those changes that have been made to the original data indicates the changes that need to be made to the snapshot copy in order to bring the backup storage device current with the primary mass storage device. The changes that need to be made to the backup storage device are registered on a listing or table.

The system allows for the identification and separation of the listing or table into information that is desirable for backup and information that is undesirable for backup. This separation can be accomplished by either flagging the desirable information or by flagging the undesirable information. Identification and separation of the information in the table reduces the amount of information for backup to only that which is desirable, thus the speed of the backup process is increased and the storage space is more efficiently used by reducing the amount of information to be backed up. Furthermore, the identification and separation prevents undesirable information from being included in the backup.

Once the changes that need to be made to the original data have been identified, the changes are sent to the snapshot copy. The snapshot copy then has available all data to bring the backup storage device current with the primary mass storage device. In order to preserve the original data during the backup process, a static snapshot of the original data is taken. This static snapshot captures the changes that have been made to the original data and that need to be transferred to the snapshot copy. In order to make the backup transparent to users, it is preferred that the static snapshot be taken in such a way that user access to the mass storage device is not interrupted.

The present invention includes a mechanism to identify when the original data is in a logically consistent state in order to determine when a static snapshot should be made. By identifying a logically consistent state and then taking a static snapshot of the changes made up to that point in time, when the changes are transferred to the snapshot copy, the snapshot copy is guaranteed to capture a logically consistent state. By capturing snapshots of successive logically consistent states, the snapshot copy can capture one logically consistent state after another. In this way, if the snapshot copy should ever be needed, the snapshot copy will be in a logically consistent state. The snapshot copy moves from one logically consistent state to another logically consistent state thus eliminating one of the problems of the prior art.

Because the present invention takes a data block approach to the backing up of a mass storage system, and because only those data block that are designated to be protected are backed up, the present invention minimizes the amount of data that needs to be transferred in making a backup to the absolutely minimum possible. For example, if a large database has five records that change, prior art systems would copy the entire large database. The present invention, however, copies only the five records that have changed. Because the amount of data is minimized, the present invention is particularly well suited to backing up data to a backup system located at a remote site. The present invention can utilize low bandwidth communication links to transfer backup data to a remote backup site. As an example, in many cases conventional dial-up telephone lines with a 56.6 k baud modem are entirely adequate.

Additional advantages of the present invention will be set forth in the description which follows, and in part will be obvious from the description, or may be learned by practice of the invention. The advantages of the invention may be realized and obtained by means of the instruments and combinations particularly pointed out in the accompanying claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both systems and methods for taking a snapshot of only those data sectors that are desirable to be backed up from a mass storage means, rather than taking a snapshot of all the data in that mass storage means. Since a snapshot is taken of only the desirable data, this invention optimizes both time and storage space in providing a back up copy of data located on a mass storage means.

The invention is described by using diagrams to illustrate either the structure or the processing of certain embodiments to implement the systems and methods of the present invention. Using the diagrams in this manner to present the invention should not be construed as limiting of its scope. The present invention can be practiced with general purpose or special purpose computers and all such computer systems should be included within its scope.

Embodiments within the scope of the present invention also include computer-readable media having encoded therein computer-executable instructions or data structures. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, magneto-optical storage devices, or any other medium which can be used to store the desired computer-executable instructions and data structures and which can be accessed by a general purpose or special purpose computer. Combinations of the above should also be included within the scope of computer-readable media. In turn, registers of a CPU or other processing unit that store computer-executable instructions or data structures while decoding and executing the same are also included within the scope of the computer-readable media. Computer-executable instructions comprise, for example, executable instructions and data which cause a general purpose computer or special purpose computer to perform a certain function or a group of functions.

The term "data block" is used to describe a block of data that is written to or read from a mass storage means. The term "data block" is intended to be broadly construed and should include any size or format of data. For example, the data stored in an individual sector on a disk is properly referred to as a data block. The amount of data stored in a group or cluster of sectors may also properly be referred to as a data block. If the mass storage means is a RAM or other word or byte addressable storage device, the term data block may be applied to a byte, a word, or multiple word unit of data. Furthermore, the term "desired data block" is used to describe a data block that is designated to be backed up, whereas the term "undesired data block" is used to describe a data block that is not designated to be backed up.

Figure 1:
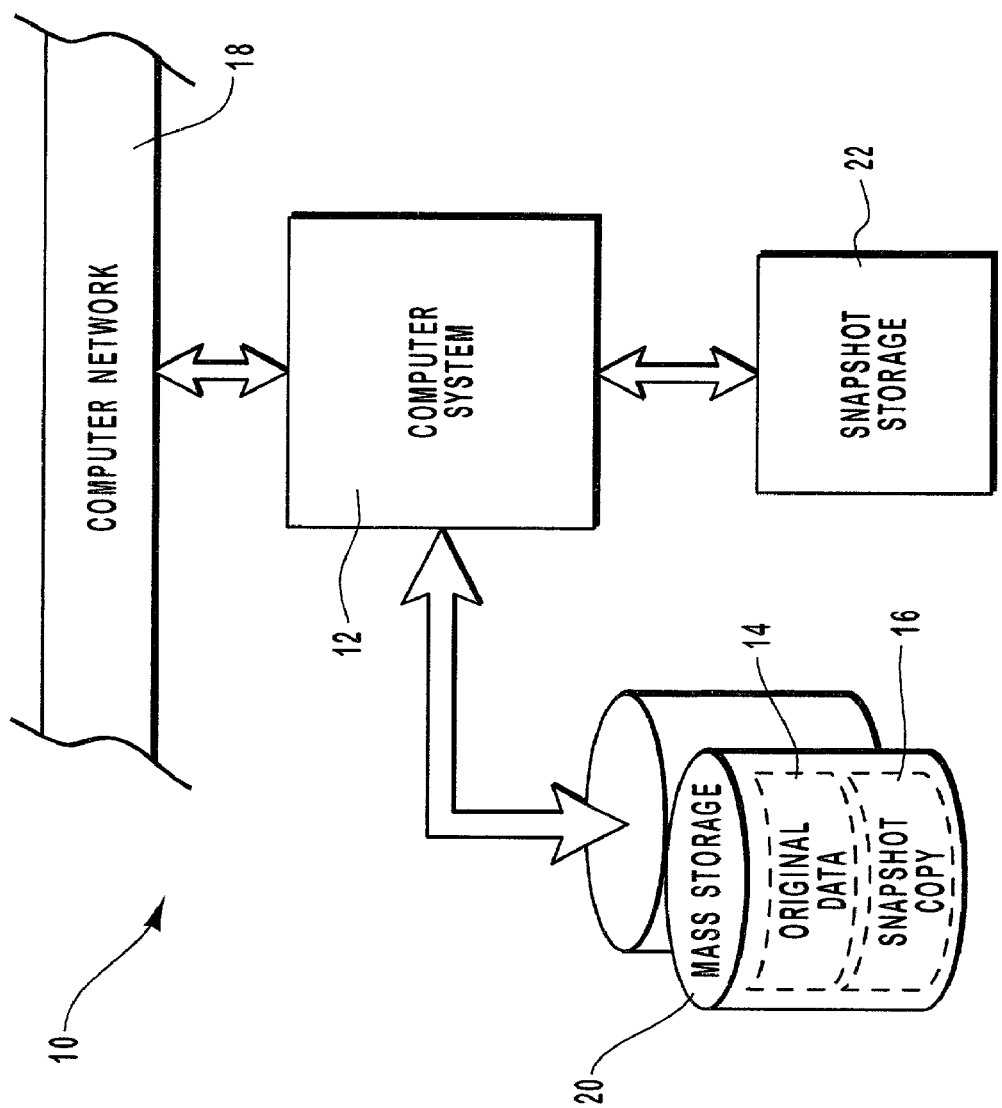
FIG. 1 is a block diagram representing a system of the present invention.

Referring now to FIG. 1, a system level block diagram of a suitable operating environment of the present invention is illustrated. The system, shown generally as 10, comprises a computer system 12 which may be any type of networked or stand alone computer system. For example, computer system 12 may be a network server computer connected to a computer network such as computer network 18. The computer system 12 may also be a stand alone system.

Computer system 12 has attached thereto mass storage means for storing a plurality of data blocks in a plurality of storage locations. Each of the storage locations is specified by a unique address or other mechanism. Mass storage means can be any storage mechanism that stores data blocks. For example, such mass storage means may comprise one or more magnetic or magneto-optical disk drives. In FIG. 1, for example, such mass storage means is illustrated by mass storage device 20.

The mass storage device 20 includes original data 14 including data blocks that are desirable to be backed up as well as data blocks that are not desirable to be backed up. Examples of data blocks that may not be desired to be backed up are swap files, free sector tables, print buffers, temp files having the ".tmp" extension, and other files not desired to be backed up.

The mass storage device 20 may also include a snapshot copy of the data blocks in the original data that are desirable to be backed up as those data blocks existed at a particular point in time. "Snapshot" copy thus refers to the fact that the copy has captured the desirable data blocks as they existed at an instant in time. Although the snapshot copy 16 is shown as being in a data storage location included within the same mass storage device as the original data, the snapshot copy 16 may instead be located in a data storage location of a different storage device. In some cases, the computer system 12 writes the snapshot data to the different storage device over a communication medium such as the computer network 18. However, in the example embodiment described herein, the snapshot copy 16 is stored on the same mass storage device 20 as the original data 14.

As described in greater detail below, embodiments within the scope of this invention use a snapshot copy of all or part of the mass storage device corresponding to desired data blocks during the backup process. Embodiments within the scope of this invention therefore comprise preservation memory means for temporarily storing data blocks of said mass storage means so as to create a static snapshot of the mass storage means at a particular point in time for the desired data blocks. As described in greater detail below, such preservation memory means may comprise any type of writeable storage device such as RAM, EEPROM, magnetic disk storage, and the like. Such preservation memory means may also comprise a portion of mass storage device 20. In FIG. 1, such preservation memory means is illustrated, for example, by snapshot storage device 22. Preservation memory means is discussed in greater detail below.

Since computer system 12 may be any type of general purpose or special purpose computer, computer system 12 may also comprise any other hardware that makes up a general purpose or special purpose computer. For example, computer system 12 may also comprise processor means for executing programmable code means. The processor means may be a microprocessor or other CPU device. The processor means may also comprise various special purpose processors such as digital signal processors and the like. Computer system 12 may also comprise other traditional computer components such as display means for displaying output to a user, input means for inputting data to computer system 12, output means for outputting hard copy printouts, memory means such as RAM, ROM, EEPROM, and the like.

Figure 2:
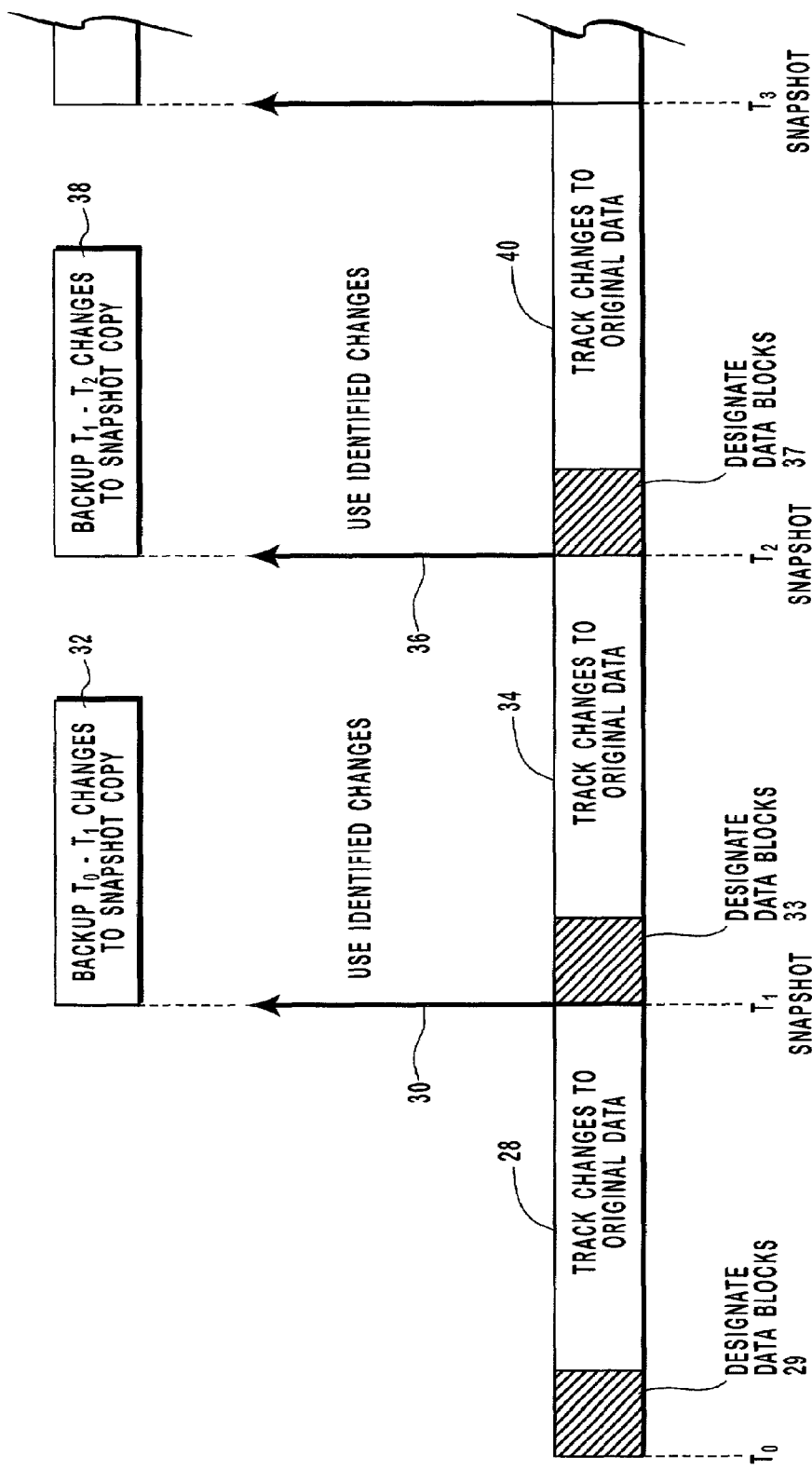
FIG. 2 is a diagram illustrating the timing of one method of the present invention.

Referring next to FIG. 2, an overview of the method used to backup original data such as original data 14 of FIG. 1, to a snapshot copy, such as snapshot copy 16 of FIG. 1, is presented. Initially, the method illustrated in FIG. 2 presumes that, as far as the desired data blocks are concerned, the original data 14 and the snapshot copy 16 are current. In this description and in the claims, "current" means that the snapshot copy contain a current copy of all the desired data blocks of the original data 14. In FIG. 2, the snapshot copy 16 is assumed to have a current copy of the original data 14 at time $T_0$.

Beginning at time $T_0$, the method summarized in FIG. 2 maintains the snapshot copy 16 in a current state with respect to the original data 14. The method summarized in FIG. 2 captures successive logically consistent states. This results in the snapshot copy 16 either moving from one logically consistent state to a subsequent logically consistent state or allows the snapshot copy 16 to capture successive logically consistent states. This creates a tremendous advantage over prior art systems which may leave the backup storage device in a logically inconsistent state. By ensuring that the backup device is in a logically consistent state, the present invention ensures that a useable snapshot copy is always available.

Returning now to FIG. 2, beginning at time $T_0$ the changes to the original data 14 corresponding to desired data blocks are tracked. This is illustrated in FIG. 2 by block 28. The changes are preferably tracked by identifying data blocks of the mass storage device that have new data written in them starting at time $T_0$ and which are desired data blocks. As explained in greater detail below, this may be done by keeping a map which identifies those data blocks that have new data written in them starting with time $T_0$ and by keeping a map of desired data blocks At some point in time, it is desirable to capture the changes that have been made to the desired data blocks in the original data 14 and to transfer those changes to the snapshot copy 16. In a preferred embodiment, the system identifies a logically consistent state of the primary mass storage device and takes a static snapshot of at least the desired data blocks that have been changed since time $T_0$. In FIG. 2, the logically consistent state is identified as time $T_1$ and a snapshot is taken.

A static snapshot is designed to preserve data as it is exists at a particular point in time so that the desired data blocks will be available after the particular point in time in their state as it existed at the snapshot time even though changes are made to the original data after the snapshot time. Many ways exist of creating such a static snapshot. Any such method works with the present invention, however, some methods are preferred over others due to various advantages. The details of how a static snapshot is taken and a preferred method for creating a static snapshot is presented below. For this summary, however, it is important to understand that any method which creates a static snapshot can be used with the present invention. It is, however, preferred that the static snapshot be taken without terminating user read or write access to the mass storage device.

Either immediately after time $T_0$ or at a time during which computing resources become available after time $T_0$, data blocks that are desired for backup are designated using a map or another data structure. Data blocks that are desired for backup can be directly designated by identifying the desired data blocks or can be implied by designating the data blocks for which a backup operation is not desired. These data blocks may be identified and designated in response to a user identifying files or file types to be backed up or not to be backed up. The file system may then be used to map these files to specific data blocks. While the foregoing techniques can be useful for designating data blocks to be backed up, the invention can be practiced with other techniques for identifying and designating data blocks to be backed up. The process of designating the data blocks for which the backup operation is desired occurs, for example, during time period 29 of FIG. 2.

At time $T_1$, the changes to desired data blocks identified between time $T_0$ and time $T_1$ are backed up by sending them to the snapshot copy 16. This is illustrated in FIG. 2 by arrow 30 and block 32. The changes are sent to the snapshot copy 16 by sending the data blocks of the original data 14 that are stored in only those storage locations where new data was written between time $T_0$ and time $T_1$ and only for desired data blocks that are designated as being protected.

Since the data is preserved by a snapshot at time $T_1$, the data is available for transfer to the backup storage device even though new data is written to the mass storage device after time $T_1$. The maps or other mechanisms that were used to track which storage locations had data written therein between time $T_0$ and time $T_1$ and that were used to designate the data blocks that were desired to be backed up are used to identify the data that should be transferred to the backup storage device. Thus, only incremental changes to desired data blocks are sent and entire files are not transferred unless the entire file changes. Furthermore, undesired data blocks are not sent even if there are changes to those data blocks.

Either immediately after time $T_1$ or at a time during which computing resources become available after time $T_1$, data blocks that are desired for backup are designated during time period 33 using a map or another data structure in the manner described above in reference to time period 29. Alternatively, the same data blocks that have been previously designated to be backed up or, equivalently, not to be backed up, can carry over into the new snapshot. In this alternative approach, the user is not required to repeatedly designate data blocks that are to be backed up. The factors that determine whether the previous designations carry over to new snapshots as described above include the frequency of the snapshots, the preferences of the user, and whether the file structure has changed since the previous snapshot.

Since new data may be written to the original data after time $T_1$ while the backup is being performed, a mechanism is used to identify the changes that are made after time $T_1$ if another backup is to be made after time $T_1$. In FIG. 2, the changes after time $T_1$, are tracked as indicated by block 34. This allows the changes to the desired data blocks made after time $T_1$ to also be transferred to the snapshot copy 16 in order to bring the snapshot copy 16 current to some later time.

As illustrated in FIG. 2, the sequence described above repeats itself at time $T_2$. This is illustrated by arrow 36, time period 37, block 38, and block 40. As described previously, the snapshot taken at time $T_2$ should represent a logically consistent state so that when the changes made to desired data blocks between times $T_1$ and $T_2$ are transferred to the snapshot copy 16, the snapshot copy 16 is brought current to the logically consistent state at time $T_2$.

From the summary given above, several observations can be made. The first observation is that the present invention backs up only the data stored in the storage locations that were changed since the last backup. This creates a significant advantage over the prior art. For example, consider a database where only a very few data records are changed. Prior art systems would attempt to backup the entire database if a change had been made. The present invention, however, only backs up those few data blocks that have been actually changed due to the database modification. Furthermore, as will be explained in further detail below, the present invention allows the data blocks that have been changed to be designated as either desirable or undesirable for backup. Therefore, only the data blocks that have been changed, between a first instant in time and a second instant in time, and are desirable for backup are sent to the snapshot copy 16. Thus, memory, processing cycles and communication bandwidth are not wasted storing backup copies of data blocks that are not desired to be backed up.

Another important difference from the prior art is highlighted in the above description. The present invention captures the data as it is exists when the snapshot is taken. The present invention does not try to send to the snapshot copy 16 the time sequence of changes that were made to the original data 14. For example, if a single record of the database was changed ten times between the time the last backup was made and the current backup time, certain prior art systems would send ten changes to backup memory device. The present invention, however, simply sends the last change that was made before the current backup time. In this example, such a scheme reduces the amount of data sent to the backup device by ten times. The present invention reduces the amount of data sent to the backup device to the very minimum needed to make a logically consistent backup. The present invention is, therefore, ideally suited to embodiments where the snapshot copy is situated at a remote site from the computer system 12. When the backup system is situated at a remote site, conventional dial-up telephone lines may be used to transfer backup data between the primary system and the backup system.

Figure 3:
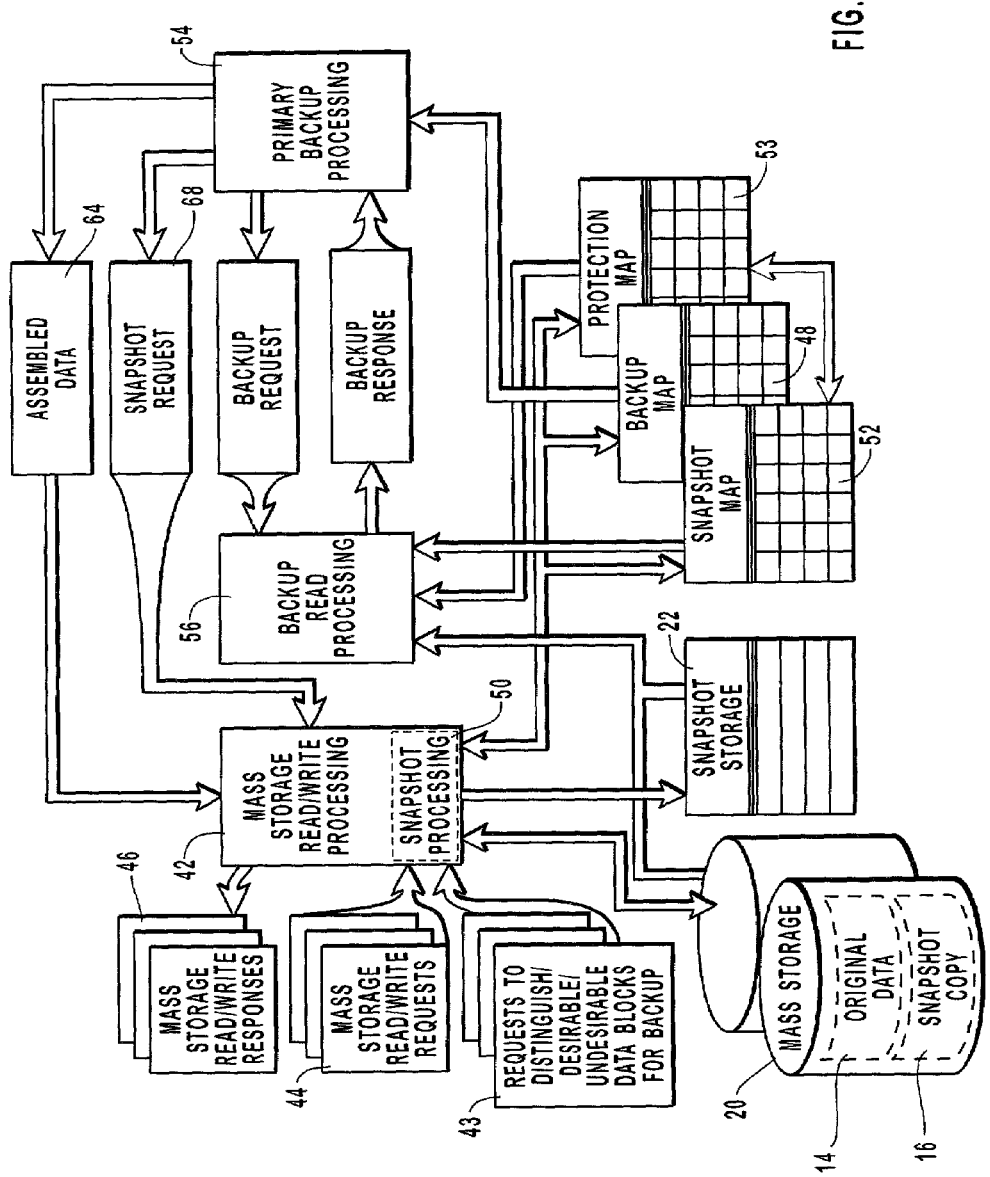
FIG. 3 is a system level block diagram of one embodiment of the present invention.

Turning next to FIG. 3, a top level diagram of one embodiment to implement the method summarized in FIG. 2 is presented. The following description presents a top level overview of each of the processing blocks illustrated in FIG. 3. The details of each processing block are then presented.

During normal operation of a computer system, data is periodically written to or read from attached mass storage means such as mass storage device 20. Embodiments within the scope of this invention therefore comprise means for writing data to a mass storage device and means for reading data from a mass storage device. In FIG. 3, such means are illustrated, for example, by mass storage read/write processing block 42. Although the details of mass storage read/write processing block 42 are presented later, the basic function of mass storage read/write processing block 42 is to write a data block to an identified storage location on primary mass storage device 20 or read a data block from an identified storage location on primary mass storage device 20. In FIG. 3, requests to read or write a data block from or to an identified storage location are illustrated by mass storage read/write requests 44. Whenever a read or write is requested, mass storage read/write processing block 42 can return a response as illustrated by mass storage read/write response 46. The responses can include a completion code or other indicator of the success or failure of the requested operation and, in the case of a read request, the data requested.

As described in conjunction with FIG. 2, a method of the present invention tracks changes that occur between a first instant in time and a second instant in time. Embodiments within the scope of this invention therefore comprise means for identifying which storage locations of the original data 14 have had new data stored therein between a first instant in time and a second instant in time. Any method for identifying and tracking such locations can be utilized with the present invention. All that is necessary is that the storage locations that have had new data stored in them since the last backup be able to be identified. In FIG. 3 such means is illustrated, for example, by backup map 48. Backup map 48 may comprise a Boolean entry for each data block on primary mass storage device 20. When a data block has new data written in it, the entry for the data block may then be set. Alternatively, a list of data blocks that have new data stored in them may also be kept. All that is required is the ability to distinguish and identify data blocks that have had new data stored therein since a particular point in time.

As previously described, when a backup is to be made, a static snapshot of at least the desired data blocks is made. Embodiments within the scope of this invention therefore comprise means for preserving a static snapshot at a particular instant in time. The use of a static snapshot is preferred because it allows users to continue to access primary mass storage device 20 while the changes are being backed up. Since it takes a period of time to transfer the changes from the original data 14 to the snapshot copy 16, the data that is to be transferred must remain unchanged until it is transferred. If the snapshot copy 16 is not located within the mass storage device 20, one way to ensure that the data remains unchanged is to prevent access to primary mass storage device 20. This prevents any data from being written to primary mass storage device 20 and ensures that the data to be backed up remains unchanged until it can be transferred to the snapshot copy 16. Unfortunately, this solution is highly undesirable. It is, therefore, preferred that when changes are to be transferred to the snapshot copy 16, a static snapshot of at least the data that will be transferred is taken. Such a static snapshot preserves the data to be transferred in its original condition until it can be transferred while simultaneously allowing continued access to mass storage device 20 so that data can continue to be written thereto or read therefrom.

Any method of preserving a static snapshot can be used with the present invention. However, it is preferred that whatever method is used be able to preserve a static snapshot without interrupting access to primary mass storage device 20. In other words, it is preferred that the static snapshot be preserved in such a way that users can continue to read data from or write data to mass storage device 20.

In FIG. 3, the means for preserving a static snapshot is illustrated by snapshot processing block 50. As illustrated in FIG. 3, it may make sense to incorporate the snapshot processing mechanism into the mass storage read/write processing block. Although the details of snapshot processing block 50 are presented below, one preferred embodiment preserves a static snapshot by copying a data block of the original data 14 that is to be overwritten from the original data 14 into snapshot storage 22 and then indicating in snapshot map 52 that the block has been preserved in snapshot storage 22. Once a copy has been placed into snapshot storage 22, then the copy of the data block in the original data 14 can be overwritten.

As described above in conjunction with FIG. 2, if a series of successive backups are to be made, it is necessary to track the changes made to the original data 14, during the time that a backup is being made. In other words, it may be necessary to track changes made to original data 14 after a snapshot is made. Embodiments within the scope of the present invention can comprise means for identifying the storage locations of the original data 14 that have new data stored therein after the point in time that a snapshot is made. Any type of mechanism that tracks and identifies storage locations of a mass storage device that have new data stored therein after a particular point in time can be utilized. For example, a map similar to backup map 48 may be used. As another example, a list of data locations that have new data stored therein after a particular point in time may also be used. Depending on the type of snapshot mechanism used, the snapshot mechanism may inherently track such information. In such an embodiment, this information may be saved for later use. In FIG. 3, such means is illustrated by snapshot map 52. As described in greater detail below, one implementation of a snapshot mechanism tracks storage locations with new data stored therein after the snapshot is made in a snapshot map, such as snapshot map 52 of FIG. 3.

Embodiments within the scope of this invention comprise means for transferring data blocks that are to be backed up to a snapshot copy. In FIG. 3 such means is illustrated, for example, by primary backup processing block 54. Although the details of primary backup processing block 54 are presented in greater detail below, the general purpose of primary backup processing block 54 is to take data blocks that are to be backed up and transfer those data blocks to the snapshot copy 16. As described in conjunction with FIG. 2, and as described in greater detail below, the data blocks to be transferred are those desired data blocks that have been stored in storage locations on the mass storage device since the last backup.

Primary backup processing block 54 may incorporate functionality to initiate a backup and transfer data to the snapshot copy 16. The details of how backups may be initiated are presented in greater detail below.

In the discussion of FIG. 2 that presented an overview of a method of the present invention, a static snapshot was used to preserve the state of changed desired data blocks at a particular point in time. Those changed desired data blocks were then backed up to the snapshot copy 16. If changed desired data blocks are preserved by a static snapshot, then before the desired data blocks can be transferred to the snapshot copy 16, they must be retrieved. Embodiments within the scope of this invention may, therefore, comprise means for retrieving desired data blocks that were preserved by a static snapshot. Such means may be part of the means for transferring desired data blocks to the snapshot copy 16 or such means may be separate. In FIG. 3, the means for retrieving desired data blocks that were preserved by a static snapshot is illustrated by backup read processing block 56. The details of one embodiment of backup read processing block 56 are presented below. This processing block retrieves preserved data from its storage location and passes a retrieved data block to primary backup processing block

54 for transfer to the snapshot copy. This functionality may also be incorporated into primary backup processing block 54. However, in order to emphasis the function performed by backup read processing block 56, the block is illustrated separately in FIG. 3.

The present invention is designed to capture one or more logically consistent backup states at the snapshot copy 16 for desired data blocks. In order to capture these logically consistent backup states, embodiments within the scope of this invention may comprise means for determining when a logically consistent state has been achieved. A logically consistent state is a state where no logical inconsistencies such as improperly terminated files exist on the mass storage system. A logically consistent state may be identified by a number of mechanisms. For example, a logically consistent state may be identified by watching the activity on the mass storage device. When no activity exists on a mass storage device, it may generally be presumed that all internal data buffers have been flushed and their data written to the mass storage system and the mass storage system is not in a state where data blocks are being updated. In addition, APIs may exist that can be called to identify when a logically consistent state has been reached. For example, the operating system or other program may have an API call that may be made that returns when a logically consistent state has been reached. As yet another example, the system may broadcast a message to all users connected to a network that a snapshot will be taken at a given time. Users can then take appropriate steps, if necessary, to ensure a logically consistent state of their files. Other mechanisms may also be used. As described in greater detail below, the means for determining when a logically consistent state has been achieved may be incorporated into one of the processing blocks of FIG. 3, as for example, primary backup processing block 54.

Figure 4:
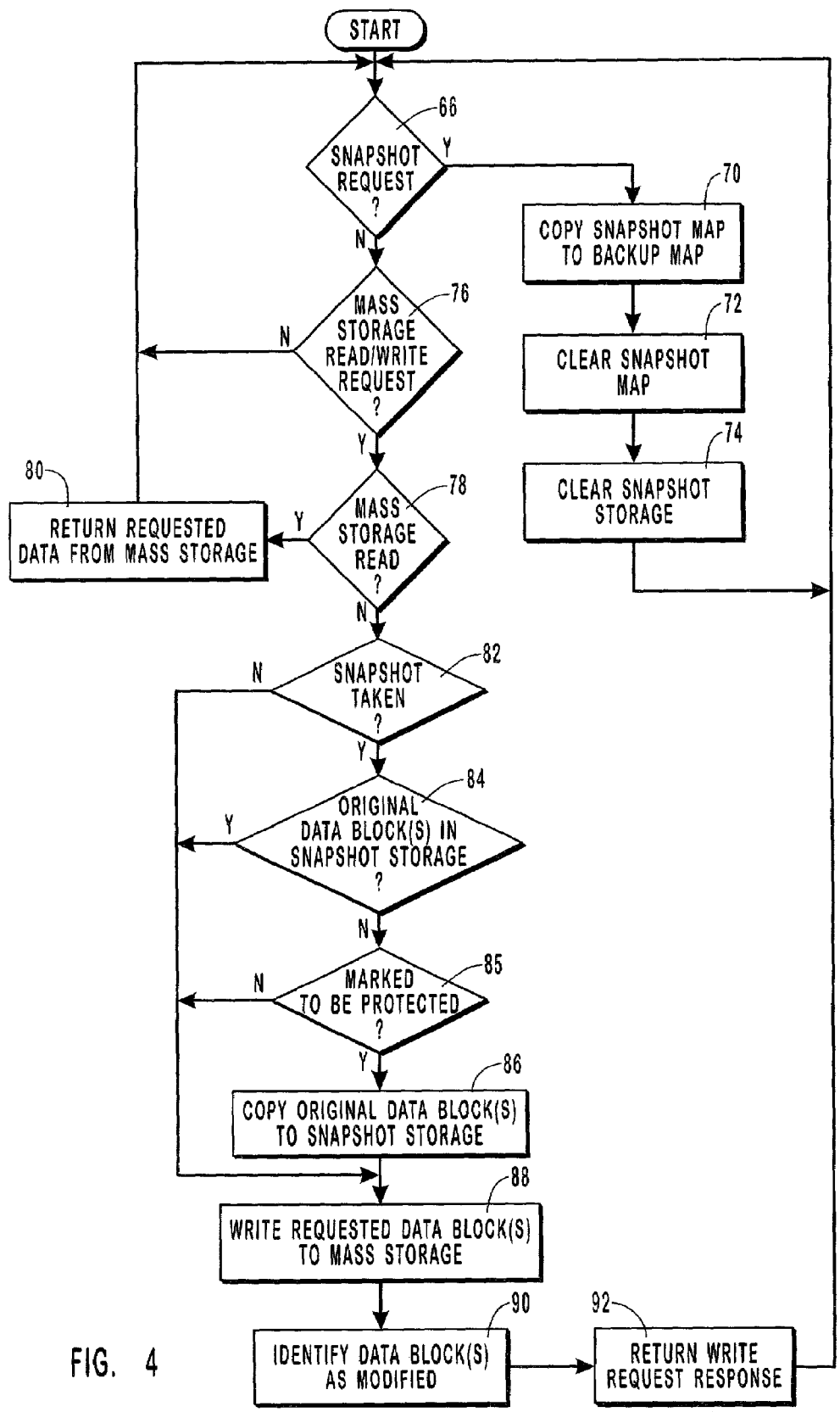
FIG. 4 illustrates the processing details of one embodiment of the mass storage read/write processing block of FIG. 3.

Referring now to FIG. 4, one embodiment of mass storage read/write processing block 42 is presented. As previously described, the function of mass storage read/write processing block 42 is to read data from or write data to mass storage device 20. In addition, assuming that snapshot processing block 50 has been incorporated into read/write processing block 42, then processing block 42 also is responsible for preserving and maintaining a static snapshot of mass storage device 20 for desired data blocks at a particular point in time. The implementation presented in FIG. 3 incorporates snapshot processing block 50 as an integral function. As previously described, however, it would also be possible to implement snapshot processing block 50 separately. The choice as to whether to incorporate snapshot processing block 50 into mass storage read/write processing block 42 or whether to implement snapshot processing block 50 separately is considered to be a design choice that is largely unimportant for purposes of the present invention. The important aspect for the present invention is to include the capability to read data from or write data to mass storage device 20 and the capability to preserve and maintain a static snapshot of at least a portion of mass storage device 20 at a particular point in time.

Turning now to FIG. 4, decision block 66 first tests whether a snapshot request has been made. This decision block identifies whether the snapshot processing functionality incorporated into mass storage read/write processing block 42 should take a snapshot of at least a portion of mass storage device 20 of FIG. 3. The snapshot request 68 is generated by primary backup processing block 54. Primary backup processing block 54 first identifies a logically consistent state before issuing such a snapshot request. In the alternative, the means for identifying a logically consistent state may be incorporated into the snapshot processing capability of mass storage read/write processing block 42. In this case, the mass storage read/write processing block 42 then identifies a logically consistent state and take a snapshot. Such details are design choices and are not important from the point of view of this invention.

Returning now to FIG. 4, if a snapshot request has been received, then the next step is to preserve a static snapshot of at least a portion of mass storage device 20 corresponding to the desired data blocks. Although any means to preserve a static snapshot can be used with the present invention, it preferred that a particular process be used to preserve a static snapshot. The preferred method is summarized in the description of steps 70, 72, 74, decision blocks 84 and 85, and step 86 described below. The method is more particularly described in U.S. Pat. No. 5,649,152, entitled "Method and System for Providing a Static Snapshot of Data Stored on a Mass Storage System," which is incorporated herein by reference. In essence, a preferred method of preserving a static snapshot utilizes a snapshot storage, such as snapshot storage 22 of FIG. 3, to preserve data blocks of a mass storage device, such as mass storage device 20 of FIG. 3, that are to be overwritten with new data. As explained in greater detail below, the data blocks that are to be preserved are first copied into the snapshot storage and a record indicating that the data block has been preserved is updated. Such a record can be stored, for example, in snapshot map 52 of FIG. 3. New data may then be written to mass storage device 20 without losing the preserved data blocks.

When a snapshot is to be taken, as evaluated by decision block 66, the next step is to copy the snapshot map into the backup map as indicated by step 70 of FIG. 4. As previously described, a backup map, such as backup map 48 of FIG. 3, is used to indicate which data blocks have changed between a first instant in time and a second instant in time. These data blocks are then transferred to the snapshot copy 16. As will become apparent in the description that follows, snapshot map 52 of FIG. 3 identifies those data blocks that have changed since a static snapshot was preserved at a particular instant in time. Thus, snapshot map 52 can be used as a backup map when a new snapshot is taken. Copying snapshot map 52 into a backup map 48 fulfills the desired function of identifying those data locations that have had new data stored therein between the time the last snapshot was taken and the current time. Obviously, it may not be necessary to copy the snapshot map to the backup map. The snapshot map may simply be used as the backup map and a new map taken as the current snapshot map.

After the snapshot map has been preserved so that it can be used as the backup map, the next step is to clear the current snapshot map. This step is indicated in FIG. 4 by step 72. The snapshot map is used to store an indication of those data blocks that have had new data stored therein since the snapshot was taken without regard for whether the changed data blocks are desired data block or undesired data blocks for backup. Thus, the snapshot map indicates which data blocks are stored in a snapshot storage, such as snapshot storage 22 of FIG. 4. Since a new snapshot is to be taken, the snapshot map must be cleared.

After the snapshot map is cleared by step 72, the next step is to clear snapshot storage, such as snapshot storage 22 of FIG. 3. This is indicated by step 74 of FIG. 4. With particular regard to this step, it should be noted that it may not be necessary to physically erase or clear the snapshot storage. Generally, as with any other type of storage, it is usually sufficient to clear the index into the storage to indicate that the storage is empty. Thus, if the index is kept as part of the snapshot storage map, such as snapshot storage map 52 of FIG. 3, then clearing the snapshot storage map as performed in step 72 would be sufficient to indicate that the snapshot storage was empty. If, however, an index into the snapshot storage was kept separately from the snapshot storage map, then the index may need to be cleared separately by step 74. After the snapshot map and snapshot storage have been cleared, the system is ready to preserve a new snapshot. Execution therefore precedes back to the start as indicated by FIG. 4.

Attention is now directed to decision block 76 of FIG. 4. This decision block tests whether a message received by mass storage read/write processing block 42 is a mass storage read or write request. By the time decision block 78 is reached, the only messages that are possible are either a mass storage read request or mass storage write request. This is because other types of requests are either handled or filtered out before decision block 78 is reached. Decision block 78 distinguishes between a mass storage read request and a mass storage write request. If a request is a mass storage read request, then the next step is to retrieve the requested data block from mass storage device 20 and return the data to the process making the request. This is illustrated in step 80. If, however, the request is a write request, then execution proceeds to decision block 82.

Decision block 82 determines whether a snapshot is to be preserved. As previously described, in a preferred embodiment a snapshot is preserved by copying data blocks that are to be overwritten to a preservation memory such as snapshot storage 22 of FIG. 3. In this embodiment, the snapshot is in essence preserved incrementally. In other words, when the snapshot is preserved, the snapshot storage is prepared to preserve data blocks as previously described in steps 72 and 74. Thereafter, no data is stored in the snapshot storage until an actual write request occurs that will overwrite data that should be preserved. Thus, when a snapshot is preserved in this manner, it is important to determine if a snapshot has been taken or if write requests should occur to the mass storage system without worrying about preserving snapshot data. Decision block 82 tests whether the write request should occur without preserving snapshot data or whether snapshot data should be preserved for write requests. If the write requests should occur without preserving snapshot data, decision block 82 indicates that execution proceeds to step 88 where the data blocks are written to the mass storage device, such as mass storage device 20 of FIG. 3. If, however, snapshot data should be preserved, then execution proceeds to decision block 84.

As previously described, when a snapshot is taken according to a preferred embodiment, data which is to be overwritten is first copied to a snapshot storage, such as snapshot storage 22 of FIG. 3. After the data has been preserved in the snapshot storage, the new data block can be written to the mass storage system. The goal of a snapshot is to preserve the data as it exists on the mass storage system at a particular point in time. Thus, the snapshot need only preserve the data as it existed at the time of the snapshot. Decision block 84 tests whether the original data block stored on the mass storage system at the time that the snapshot was taken has previously been preserved in the snapshot storage. In other words, if the data currently stored at the designated write storage location is data that was stored at that location at the moment in time when the snapshot was taken, and if the write request occurred without first preserving the data, the original data would be lost. If, however, the original data stored therein at the time the snapshot was taken has previously been preserved in the snapshot storage, then the write request may occur and overwrite whatever data is stored at the designated location without worry since the original data has previously been preserved. If, therefore, decision block 84 determines that the original data has not yet been stored in the snapshot storage, then execution proceeds to decision block 85.

Decision block 85 determines whether the data block is marked to be protected. As illustrated in FIG. 3 with protection map 53, a user may designate the data blocks as either desirable or undesirable for backup so that only the data blocks that are desirable for back up are actually backed up. Data blocks that are designated as desirable for backup have been and are referred to herein as desired data blocks, whereas data blocks that are not designated as desirable for backup have been and are referred to as undesired data blocks. This feature reduces the amount of time and storage space required for backup. Requests to designate desirable/undesirable data blocks for backup 43 are received by mass storage read/write processing 42.

The data blocks on snapshot map 52 indicate the data blocks that are stored in snapshot storage 22 as a result of the most recent static snapshot taken. Mass storage read/write processing 42 indicates on the protection map 53 those data blocks that are desirable for backup. Alternatively snapshot processing can indicate on protection map 53 those data blocks that are undesirable for backup, preventing their backup by marking them as always being current. Also, in another embodiment, snapshot map 52 and protection map 53 can be one map. In other words, the functions performed on protection map 53 can be performed on snapshot map 52.

If the data block is not marked to be protected, or in other words are not desirable for backup, then execution proceeds from decision block 85 to step 88 skipping step 86. Alternatively, if the data block is marked to be protected, then execution proceeds to step 86, where the original data blocks are copied into the snapshot storage 22.

Figure 6:
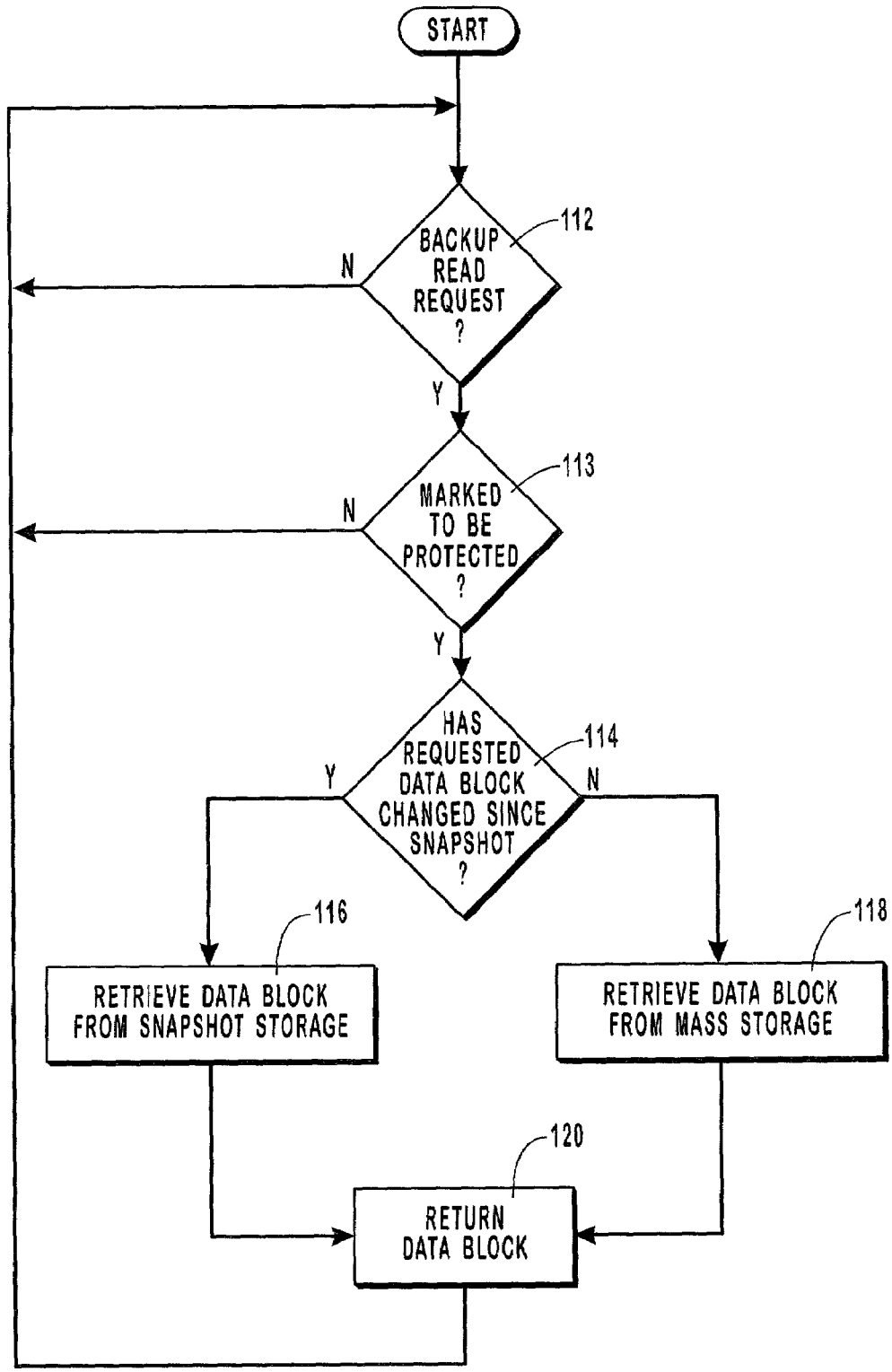
FIG. 6 illustrates the processing details of one embodiment of the backup read processing block of FIG. 3.

In some embodiments, step 85 can be omitted. Changed data blocks would be preserved independently of whether they were desirable data blocks or not. Then, when sending data blocks to the snapshot copy, backup read processing 56 can filter out any undesirable data blocks using protection map 53 so that only desirable data blocks are sent to the snapshot copy, as step 113 of FIG. 6 illustrates.

After the original data has been preserved by step 86, or a determination was made by decision block 84 that the original data had previously been preserved, or a determination was made by decision block 85 that the data block is not marked to be protected, then execution proceeds to step 88 where the write request is fulfilled by writing the data block included with the write request to the designated storage location on the mass storage device.

Step 90 then identifies the storage location as containing new data. As previously described, this may be accomplished by placing an entry in a snapshot map, such as snapshot map 52 of FIG. 3. Step 90 represents but one example of the previously described means for identifying storage locations of a mass storage device that have new data written therein. A response may then be returned to the process making the write request. The sending of such a response is indicated in FIG. 4 by step 92. Such responses are typically sent to the process that issues the write request not only to indicate the success or failure of the write operation but also to indicate completion of the write operation. Execution then proceeds back to the start where the next request is handled.

Figure 5:
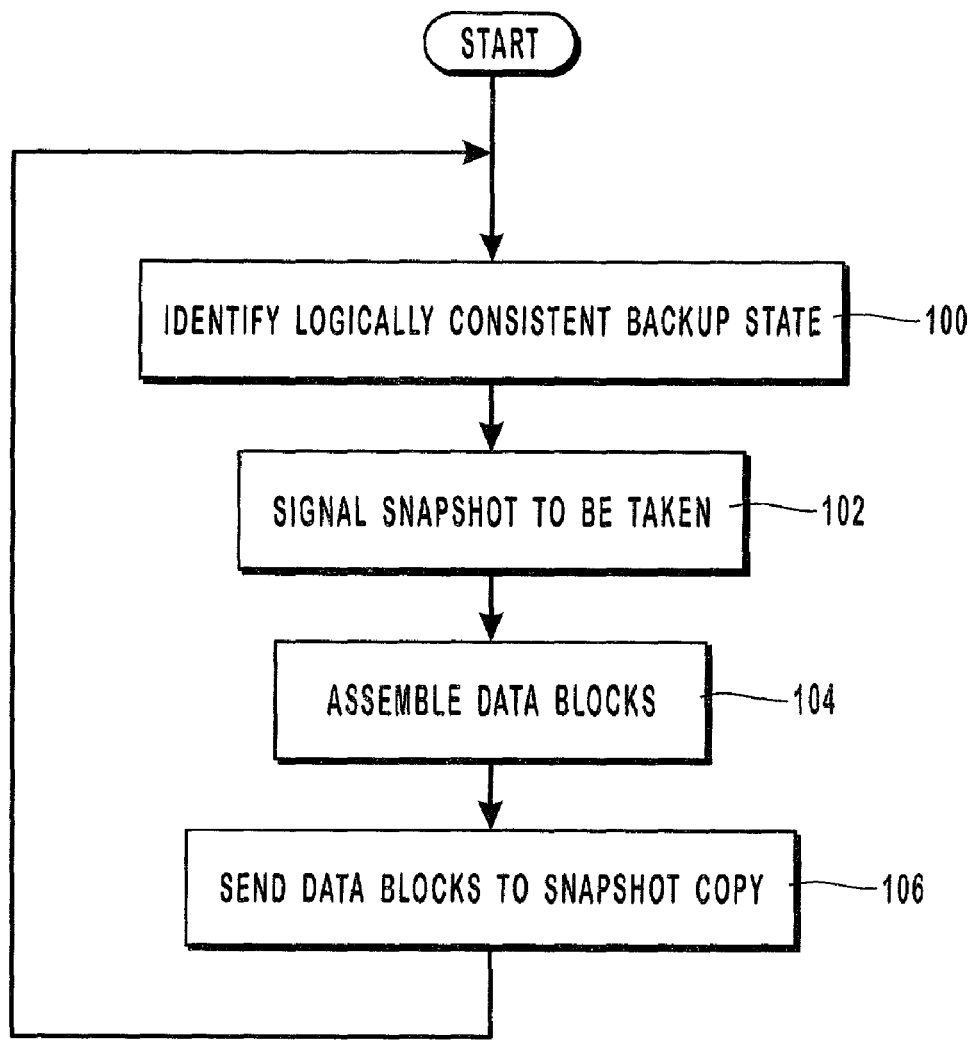
FIG. 5 illustrates the processing details of one embodiment of the primary backup processing block of FIG. 3.

Turning next to FIG. 5, the details of one embodiment implementing primary backup processing block 54 is presented. As previously described, primary backup processing block 54 is responsible for obtaining the data blocks that need to be transferred to the snapshot copy and then accomplishing the transfer. First, step 100 identifies a logically consistent backup state. After a logically consistent state has been identified, then a snapshot of the logically consistent state is preserved so that the backup may proceed. The snapshot is preserved by step 102 which signals the snapshot processing, as for example snapshot processing block 50 incorporated into a mass storage read/write processing block 42 of FIG. 3, to take the snapshot. In one embodiment, this results in snapshot request 68 being sent to mass storage read/write processing block 42. As previously described, this request causes steps 70, 72, and 74 of FIG. 4 to be executed, which prepares for the snapshot to be taken. Thereafter, original data for designed data blocks stored in the mass storage device 20 at the time the snapshot was taken is preserved by decision block 84, decision block 85 and step 86 of FIG. 4.

After the snapshot has been taken in order to preserve the logically consistent backup state identified by step 100 of FIG. 5, the next step in FIG. 5 is to assemble data blocks for transfer to the snapshot copy 16 as indicated by step 104. After the data blocks have been assembled to form assembled data 64, step 106 sends the assembled data 64 to the snapshot copy 16. This may be accomplished by sending the data to the mass storage read/write processing block 42 for writing into the snapshot copy. Execution then proceeds back to the start where primary backup processing block 54 identifies a subsequent logically consistent state to repeat the above-described process.

As previously described, the data blocks that are sent to the snapshot copy 16 by step 104 are only those data blocks that have changed since the last backup and are desired to be backed up. Furthermore, the data blocks are transferred as they existed at the moment in time that the snapshot was taken. Thus, only those data blocks that are identified in a backup map, such as backup map 48 of FIG. 3, as having changed and identified as protected in a protection map, such as protection map 53 of FIG. 3 are transferred. The snapshot preserves those desired data blocks in the state that they were in when the snapshot was taken. Primary backup block 54 therefore needs to retrieve certain data blocks that were preserved by the snapshot. Primary backup processing block 54 may incorporate the functionality needed to retrieve the data blocks from the snapshot and/or mass storage system, or such functionality may be incorporated into a separate processing block. A separate processing block incorporating this functionality is illustrated in FIG. 3 by backup read processing block 56. FIG. 6 presents one embodiment of backup read processing block 56 designed to recover the data preserved by these snapshots.

In FIG. 6, decision block 112 highlights the fact that backup read processing block 56 only handles read requests that are to retrieve the data as it existed at the moment in time when the snapshot was taken. This decision block may not be necessary if the structure and architecture of the processing guarantees that only such read requests are sent to backup read processing block 56 of FIG. 3. Similarly, decision block 113 highlights the fact the backup read processing block 56 only retrieves desired data blocks for eventual transfer to the backup system. The check for whether a data block is a desired data block may be accomplished by referring to protection map 53 of FIG. 3.

Under appropriate circumstances, decision block 113 may be omitted. For example, as illustrated in decision block 85 of FIG. 4, some embodiments of the present invention may preserve only data blocks that have been marked as protected. Where only protected data blocks are placed in snapshot storage, decision block 113 may be eliminated because an indication by decision block 114 that a data block has been stored in snapshot storage necessarily means that the data block was marked to be preserved.

In order to retrieve a desired data block, as it existed at the moment in time when the snapshot was taken, it must be determined where the data block resides. As previously described in conjunction with FIG. 4, after a snapshot is taken, the first time that a desired data block is to be overwritten by a new data block, the desired data block is copied into a snapshot storage, such as snapshot storage 22 of FIG. 3. This means that if a desired data block is never overwritten, then the desired data block stored on the mass storage device is the original desired data block, as it existed when the snapshot was taken. If, however, the desired data block has been overwritten one or more times, then the original desired data block is stored in the snapshot storage. Decision block 114 of FIG. 6 determines whether the requested desired data block has been changed since the snapshot was taken. This may be accomplished by checking a snapshot map, such as snapshot map 52 of FIG. 3, in order to determine whether the data block has been modified. As previously described, the snapshot map identifies those storage locations or data blocks that have changed since the snapshot was taken.

If the storage location has had new data stored therein since the snapshot was taken, then step 116 indicates that the data block is retrieved from snapshot storage. If, however, the content of a storage location has not changed since the snapshot was taken, then step 118 indicates that the data block is retrieved from mass storage device 20. In either case, the data block designated as protected is returned to the requesting process by step 120.

Figure 7A:
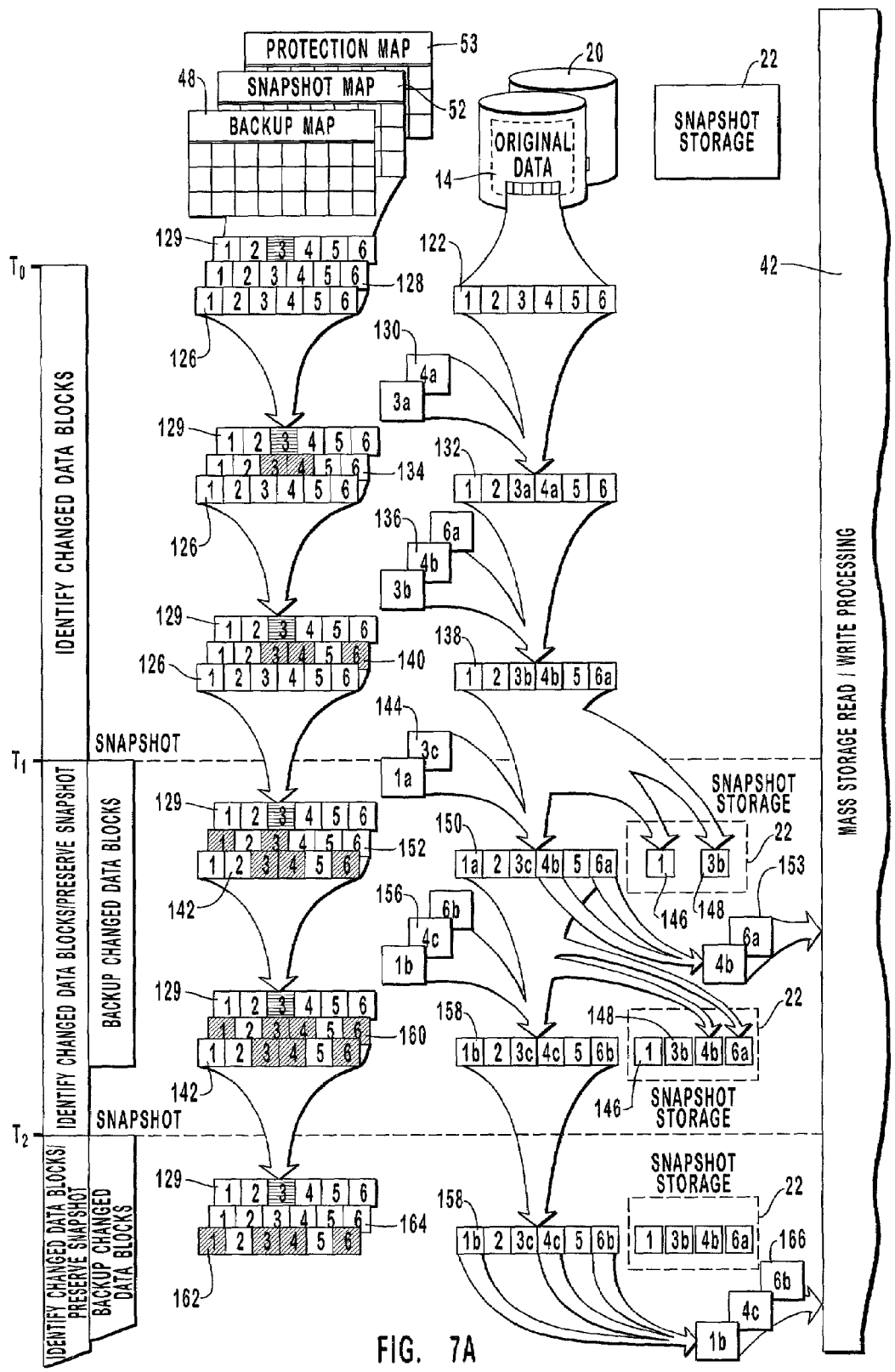
FIGS. 7A and 7B are diagrams illustrating an example of a method according to one embodiment of the present invention.
Figure 7B:
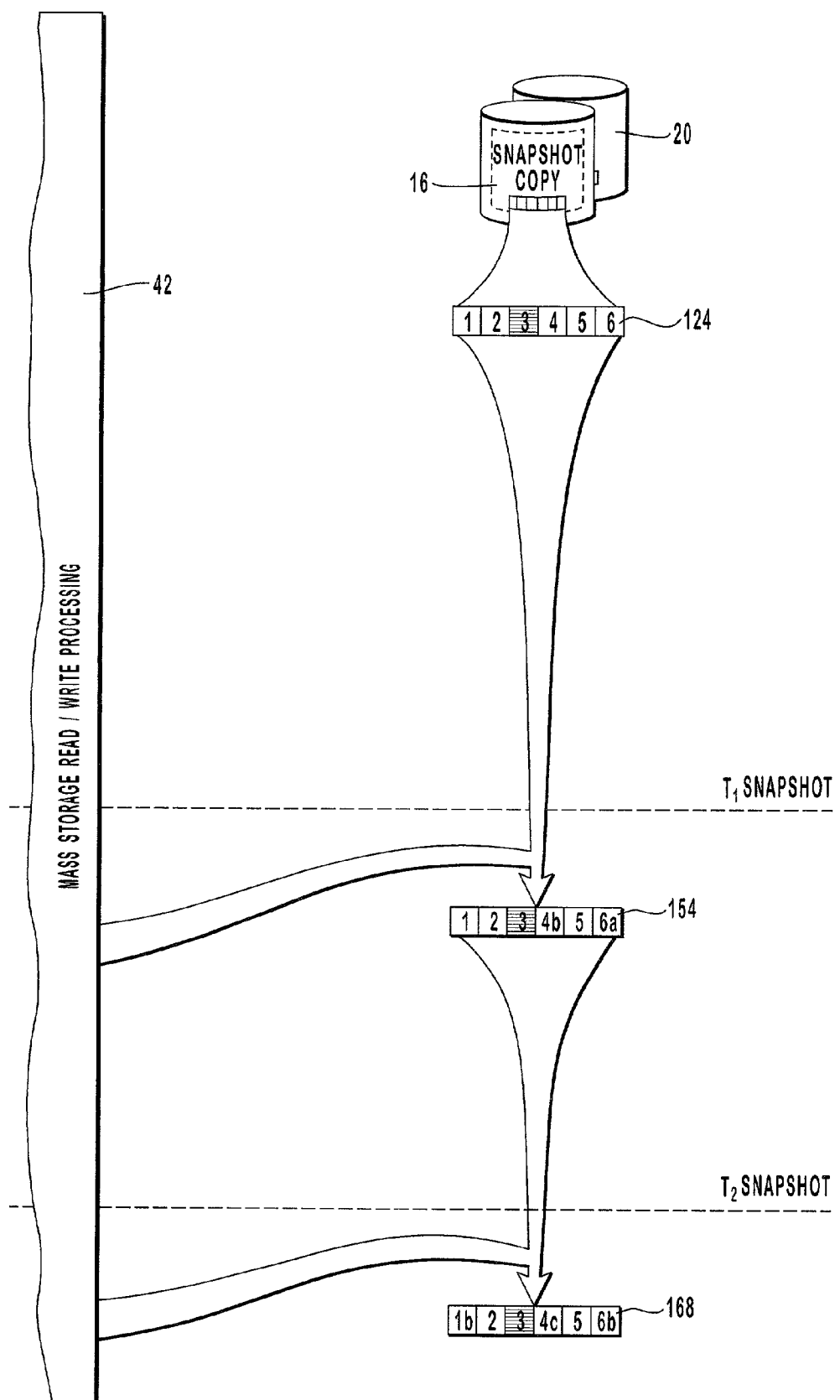
Figure 8A:
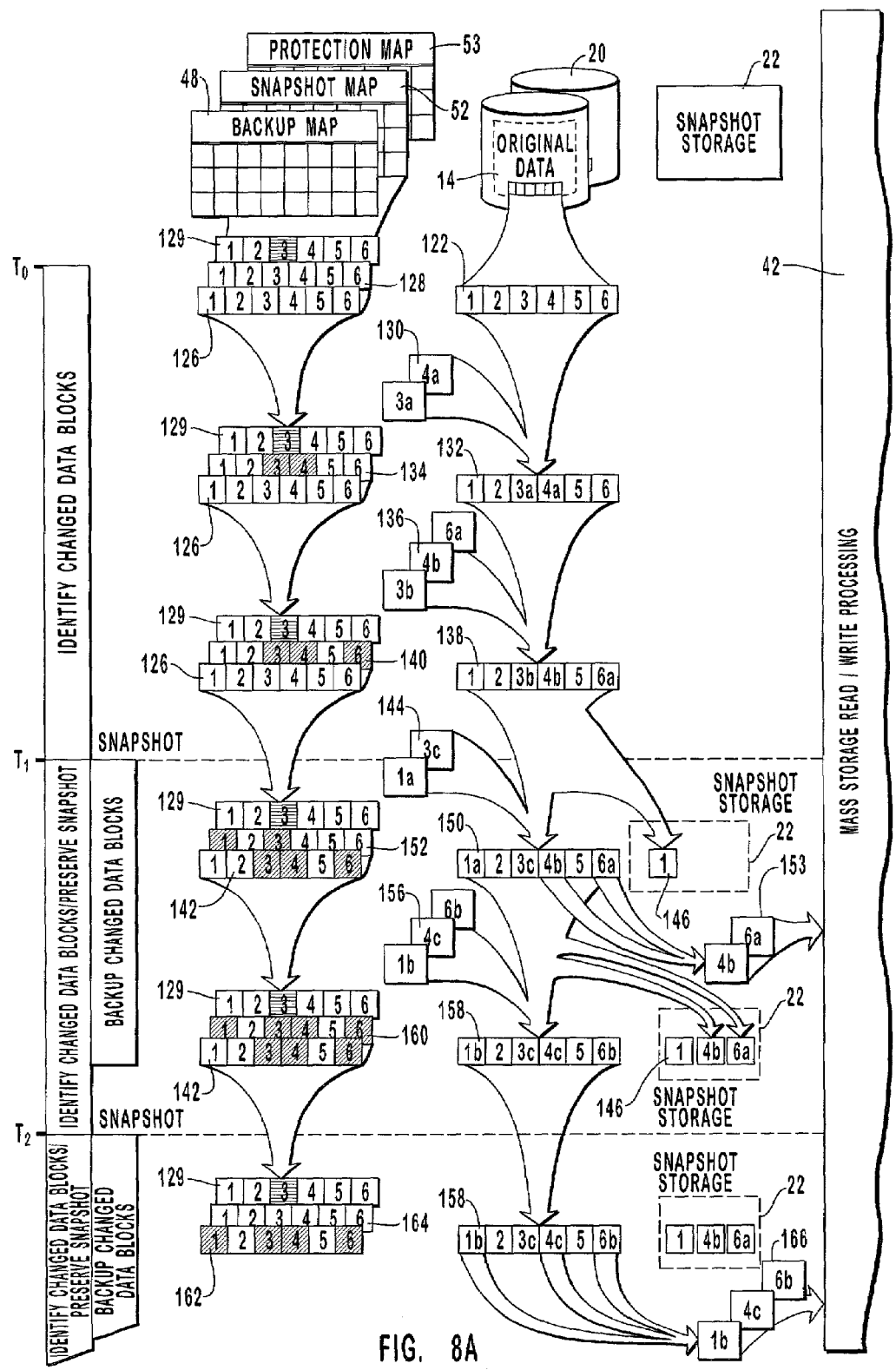
FIGS. 8A and 8B are diagrams illustrating an example of a method according to one embodiment of the present invention.
Figure 8B:
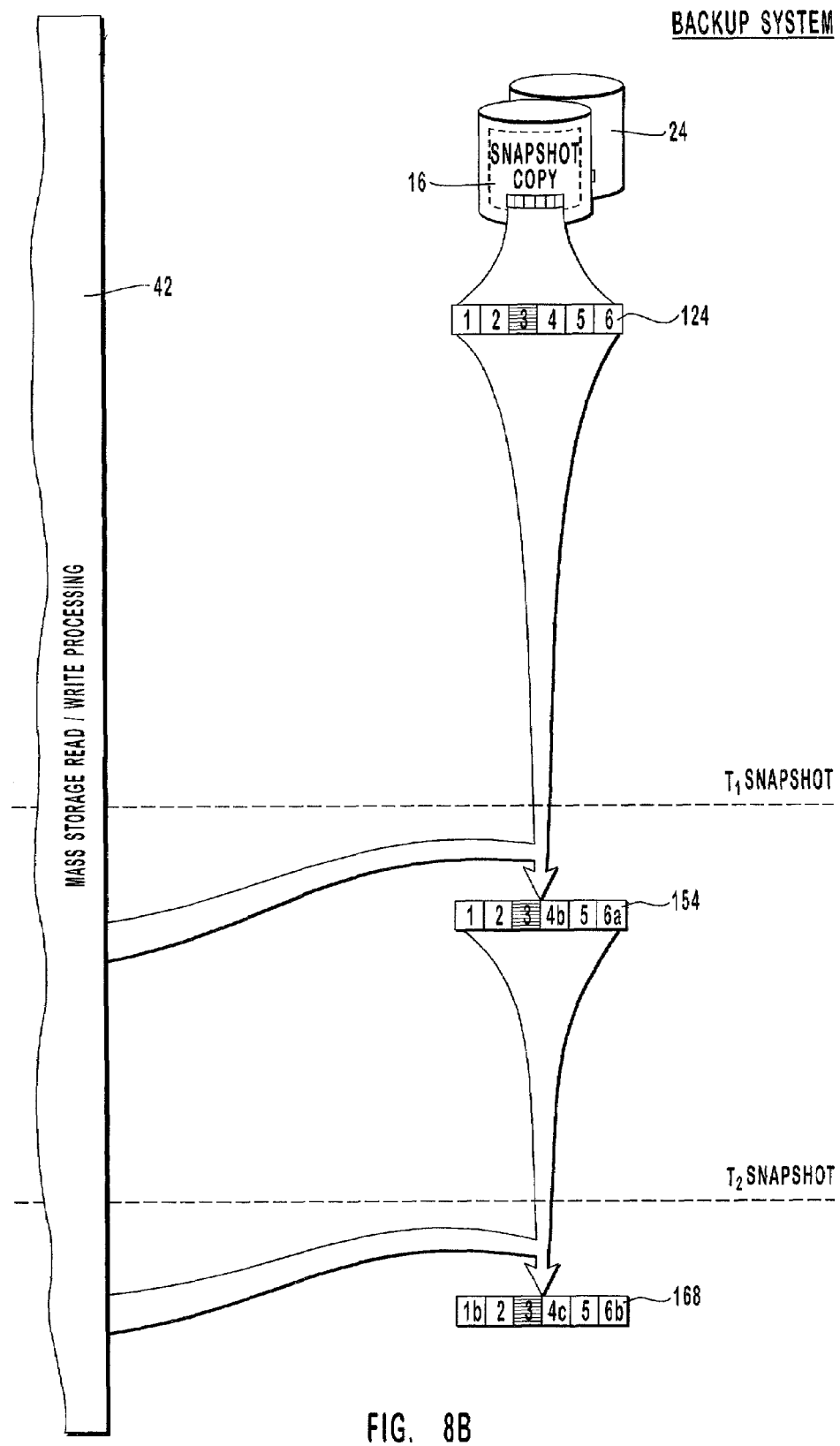

In order to illustrate in greater detail the operation of FIGS. 3-6 in creating a backup, a detailed example is presented in FIGS. 7A, 7B, 8A and 8B. The embodiment illustrated in FIGS. 7A and 7B differs from the embodiment shown in FIG. 8A and 8B in that FIGS. 7A and 7B operate as if decision block 85 were not present in FIG. 4. Therefore, FIGS. 7A, and 7B portray an embodiment of the present invention that stores both protected and unprotected data blocks in snapshot memory, but provides only protected data blocks when data blocks are requested from the snapshot memory. In contrast, FIGS. 8A, and 8B depict an embodiment of the present invention that stores only protected data blocks in snapshot storage, meaning that if a data block appears in snapshot storage it necessarily is a protected data block. As indicated above, the invention may be practiced with or without decision block 85 of FIG. 4 (storing only protected data blocks in snapshot storage). The discussion of FIGS. 7A and 7B that follows presumes that decision block 85 of FIG. 4 is not present, and therefore both protected and unprotected data blocks are stored in snapshot storage.

Referring first to FIG. 7A, consider a group of data blocks 122, stored in storage locations numbered 1-6, of the original data portion 14 of the mass storage device 20. Similarly, backup map 48 has six map locations 126 that correspond to storage locations 122, snapshot map 52 has six map locations 128 that correspond to storage locations 122, and protection map 53 also has six map locations 129 that correspond to storage locations 122. As illustrated in FIG. 7A, at time $T_0$ map location 126, 128 are cleared. However, location 3 of map location 129 is marked, indicating that data block 3 of data blocks 122 is not designated as protected.

FIG. 7B shows that the snapshot copy 16 portion of the mass storage device 20 also has a group of data blocks 124, similarly stored in storage locations numbered 1-6. However, data block 3 is shown only to insure that corresponding data blocks in FIGS. 7A and 7B have corresponding numbers. Because location 3 of map location 129 in FIG. 7A indicates that data block 3 of data blocks 122 is not to be transferred during backup, data block 3 of data blocks 124 in backup storage 24 does not necessarily exist. That is, backup storage 24 does not necessarily have a data block that corresponds to data block 3 of data blocks 122 from primary mass storage 20. As such, data block 3 can be omitted from data blocks 124 entirely, rather than simply graying the block out. At time $T_0$, the data blocks stored in 124 are identical to the data blocks stored in 122 at least so far as the desired data blocks 1, 2 and 4-6 are concerned.

Assume that after time $T_0$, data blocks 130 are to be stored in locations 3 and 4 of storage locations 122. One or more mass storage write requests are then presented to mass storage read/write processing block 42 of FIG. 3 in order to have data blocks 130 written to the appropriate storage locations. Turning to FIG. 4, the mass storage write request is processed in the following manner.

Decision blocks 66, 76, and 78 combine to determine that a write request is being presented to mass storage read/write processing block 42. Execution thus passes through these three decision blocks to decision block 82. As described previously, decision block 82 tests whether a snapshot has been taken. At this point in the example, no snapshot has been taken. Execution thus proceeds to step 88 which writes the requested data blocks into the mass storage 20 in FIG. 7A. Data blocks 130 are thus stored in storage locations 122 to produce storage locations 132. As indicated, therein, the data blocks stored in locations 3 and 4 have been modified to 3a and 4a.

Returning to FIG. 4, step 90 next indicates that the storage locations where new data has been stored should be indicated as modified. In many snapshot embodiments, a snapshot map can be used for this purpose. In FIG. 7A, map 134 is used and map locations 3 and 4 have been grayed to indicate that data has been stored in storage locations 3 and 4. Note that the storage locations in backup map 48, as indicated by map locations 126 remain unchanged at this point. Returning to FIG. 4, a write request response is returned by step 92 and execution proceeds back to the start to await the next request.

Returning now to FIG. 7A, suppose that the next request contained three data blocks 136 that were to be stored in locations 3, 4, and 6. Since a snapshot has not yet been taken, this request is handled in the same way as the previous write request with execution proceeding through decision blocks 66, 76, 78, and 82 of FIG. 4 to step 88 of FIG. 4. Step 88 indicates that the new data is stored in the mass storage device so that storage locations 138 of FIG. 7A now indicate that the data blocks stored in location 3 has been changed to 3b, the data block stored in location 4 has been changed to 4b, and the data block stored in location 6 has been changed to 6a. As with the previous write request, map locations 140 are then updated to indicate that in addition to locations 3 and 4, location 6 has also been changed. Map locations 126 remain unchanged.

Referring now to FIG. 5, assume at this point in our example that the primary backup processing block 54 of FIG. 3 then identifies a logically consistent backup state in step 100 of FIG. 5. After identifying a logically consistent backup state, step 102 sends snapshot request 68 of FIG. 3 to mass storage read/write processing block 42.

Turning now to FIG. 4, this snapshot request is processed by decision block 66 which results in steps 70, 72, and 74 being executed. In step 70, the snapshot map is copied to the backup map. In FIG. 7A, this means that map locations 140 are copied into map locations 142 of backup map 48. Thus, map locations 142 indicate that locations 3, 4, and 6 have had new data stored therein. Returning now to FIG. 4, step 72 clears the snapshot map and step 74 clears the snapshot storage as previously described. Execution in FIG. 4 then returns to the start to await further processing.

Assume at this point, that a write request arrives at mass storage read/write processing block 42 requesting that data blocks 144 of FIG. 7A be stored in storage locations 138. Because this is a write request, execution proceeds through decision blocks 66, 76, and 78 to decision block 82 of FIG. 4. Unlike previous write requests, a snapshot has now been taken at time $T_1$ as indicated in FIGS. 7A and 7B. Thus, execution proceeds to decision block 84.

Decision block 84 determines whether the data stored in the storage locations that are to be overwritten have been previously stored in snapshot storage. In this example, data blocks 144 are to be stored in storage locations 1 and 3. Since storage locations 1 and 3 have not yet been placed in snapshot storage, execution proceeds to step 86 where locations 1 and 3 of storage locations 138 are copied to snapshot storage 22. (Remember, in this embodiment, decision block 85 of FIG. 4 is not present.) In FIG. 7A, this is illustrated by storage location 146 containing data block 1 and storage location 148 containing data block 3b.

After data blocks 1 and 3b have been preserved in snapshot storage 22, the new data blocks are written to the mass storage device in step 88. Returning to FIG. 7A, this means that data blocks 1a and 3c are written into storage locations 138 in order to produce storage locations 150 where data block 1a has overwritten data block 1 and data block 3c has overwritten data block 3b. Step 90 of FIG. 5 then states that the data blocks need to be identified as modified. Thus, map locations 152 of snapshot map 52 are modified to indicate that storage location 1 and storage location 3 have new data stored therein. A write request response is then returned as directed by step 92 of FIG. 4.

Returning now to FIG. 5, the snapshot was taken at time $T_1$ by mass storage read/write processing block 42 of FIG. 3 as directed by step 102 of FIG. 5. Steps 104 and 106 then indicate that the data blocks that were changed before the snapshot was taken should then be assembled into transmit packets and sent to the snapshot copy 16. The data blocks that should be transferred are indicated by the information contained in backup map 48 and protection map 53.

Returning to FIG. 7A, map locations 142 of backup map 48 indicate that storage locations 3, 4, and 6 have been changed prior to the snapshot taken at time $T_1$. An examination of snapshot locations 152 indicates that data blocks 4 and 6 are on the mass storage system and data block 3 is in the snapshot storage 22. Step 104 of FIG. 5 then requests that data blocks stored in storage locations 3, 4 and 6 be retrieved by backup read processing block 56 of FIG. 3.

Backup read processing block 56 processes these requests received from primary backup processing block 54 as illustrated in FIG. 6. The request is for the data blocks stored in storage locations 3, 4, and 6. With regard to the data block stored in storage location 3, decision block 113 determines that the data block stored in storage location 3 is marked to be unprotected and is therefore not returned in step 120.

Since the data blocks stored in locations 4 and 6 are not marked to be unprotected, decision block 114 of FIG. 6 then retrieves the data blocks stored in storage locations 4 and 6 from the mass storage device in step 118 and returns them to primary backup processing block 54 in step 120. This process is illustrated graphically in FIG. 7A where data blocks 153 are assembled by retrieving data blocks 4b and 6a from storage locations 150. Data blocks 153 are then transferred to the snapshot copy 16, via mass storage read/write processing 42. This is graphically illustrated in FIGS. 7A and 7B. In FIG. 7B, data blocks 153 are received by the snapshot copy 16 and applied to storage locations 124 to achieve storage locations 154. Storage locations 154 are identical to storage locations 138 of the original data (FIG. 7A) with the exception of storage location 3 since it was identified as undesirable for backup. Recall that storage locations 138 represented the state of mass storage device 20 at time $T_1$ when the snapshot was taken. Thus, the changes that have occurred between time $T_0$ and time $T_1$ have now been backed up to the snapshot copy 16 in order to bring snapshot copy 16 current with original data 14 at time $T_1$.

Returning now to FIG. 7A, suppose that data blocks 156 are now to be written to storage locations 150. The writing of data blocks 156 causes a change to the data blocks stored in storage locations 1, 4, and 6. Mass storage read/write processing block 42 handles the write of the data blocks to be stored in locations 4 and 6 as previously described with the data blocks 144 stored in those locations after time $T_1$ (data block 4b and data block 6a) being stored in snapshot storage 22. New data blocks 4c and 6b then are written to mass storage device 20.

With regard to the data block that is to be stored in storage location 1, execution proceeds in FIG. 4 down to decision block 84. Recall this decision block tests whether the data block stored in the storage location at the time that the snapshot was taken has previously been preserved in the snapshot storage. With regard to the data block stored in storage location 1, the data block has been previously preserved in snapshot storage 22 as indicated by data block 146 of FIG. 7A. Thus, FIG. 4 indicates that step 86 is skipped and the new data is simply written to the mass storage device. In FIG. 7A, this results in data block 1b replacing data block 1a so that data block 1a is lost.

Recall that the present invention only transfers the desired data blocks of those storage locations that have changed since the last backup. Furthermore, the data blocks are transferred as they exist at the time that the snapshot is made. Thus, if a particular storage location in the original data has five different data blocks stored therein during the time since the last backup, only the data block stored last (e.g. just before the snapshot is taken) is transferred to the snapshot copy. This is because the snapshot copy 16 only preserves a logically consistent backup when the backup is taken. In other words, the snapshot copy moves from a logically consistent state at one moment in time to a logically consistent state at another moment in time. Preserving logically consistent backups of the desired data blocks at discrete moments in time provides significant advantages over prior art systems.

For example, consider a prior art system that captures each and every change made to the original data. Such a prior art system will attempt to send every write operation both to the original data and to the backup copy. In theory, this makes the backup copy an identical copy of the mass storage device. However, problems arise with this approach. Specifically, sending each an every update to the backup copy requires a relatively large bandwidth. By consolidating multiple updates of a single data block into a single update, the present invention reduces the amount of data that must be transferred between the original and backup copies.

Furthermore, if the primary system that contains the original data crashes during a write update, it may leave the original data in a logically inconsistent state. If the backup copy is tracking every change made to the original data, then when the primary system crashes, the backup copy may also be left in the same logically inconsistent state. This example highlights the problem of leaving a known logically consistent state before a second logically consistent state has been identified. The present invention avoids this problem by maintaining the prior logically consistent state until a new logically consistent state has been identified and then moves the snapshot copy from the previous logically consistent state to the next logically consistent state without transitioning through any logically inconsistent states between the two logically consistent states.

Returning to FIG. 7A, when data blocks 156 are applied to storage locations 150, storage locations 158 result. Map locations 152 are then updated to indicate that the storage locations that have been changed since time $T_1$ now include storage locations 4 and 6 in addition to storage locations 1 and 3. This is illustrated in FIG. 7A by map locations 160 of snapshot storage 52.

Assume that a second backup is now to be made of mass storage device 20. In this case, the backup is made as previously described in FIG. 5, where execution proceeds to step 100 where a logically consistent state is identified. In FIG. 7A, assume this logically consistent state was identified at time $T_2$. Step 102 of FIG. 5 then signals a snapshot to be taken at time $T_2$. As previously described in conjunction with the snapshot taken at time $T_1$, mass storage read/write processing block 42 receives a snapshot request, such as snapshot request 68 of FIG. 3, and copies the snapshot map to the backup map in step 70. This is indicated in FIG. 7A where map locations 162 of backup map 48 are changed to be the same as map locations 160 of snapshot map 52.

Steps 72 and 74 of FIG. 4 then indicate that the snapshot map and snapshot storage should be cleared. In FIG. 7A, the snapshot map is cleared as indicated by map locations 164 of snapshot map 52. Snapshot storage 22, however, still shows data blocks stored therein. This is to illustrate that the data blocks may still physically reside in snapshot storage 22 as long as the index to snapshot storage 22 is cleared so that snapshot storage 22 appears to contain no data blocks.

Assuming that no data blocks are within storage locations 158 after the snapshot taken at time $T_2$, then data blocks 166 are read from storage locations 158 according to the process described in FIG. 6. Note that location 3 of storage locations 158 is not read because decision block 113 of FIG. 5 uses protection map locations 129 to determine that location 3 is not protected. Therefore, data block 3c is not read and transferred to the backup system. The data blocks that are read are then transmitted to the snapshot copy via mass storage read/write processing block 42 as illustrated in steps 104 and 106 of FIG. 5. As illustrated in FIG. 7B, data blocks 166 are then applied to storage locations 154 in order to arrive at storage locations 168, which are an identical copy of storage locations 158 of the original data (FIG. 7A) except for storage location 3 since it was identified as being undesirable for backup.

Turning now to FIGS. 8A and 8B, FIGS. 8A, and 8B depict an embodiment of the present invention that stores only protected data blocks in snapshot storage, meaning that if a data block appears in snapshot storage it necessarily is a protected data block. As indicated above, the invention may be practiced either with or without decision block 85 of FIG. 4 (storing only protected data blocks in snapshot storage). The discussion of FIGS. 8A and 8B that follows presumes that decision block 85 of FIG. 4 is present, and therefore only protected data blocks are stored in snapshot storage. Because much of the foregoing discussion of FIGS. 7A and 7B also applies to 8A and 8B, the following description of FIGS. 8A and 8B concentrates on the differences between FIGS. 7A, 7B, 8A, and 8B—the operation of snapshot storage 22.

At time $T_1$, as further illustrated in FIG. 3, a snapshot request 68 is sent to mass storage read/write processing block 42. Turning again to FIG. 4, this snapshot request is processed by decision block 66 which results in steps 70, 72, and 74 being executed. In step 70, the snapshot map is copied to the backup map. In FIG. 8A, this means that map locations 140 are copied into map locations 142 of backup map 48. Thus, map locations 142 indicate that locations 3, 4, and 6 have had new data stored therein. Returning to FIG. 4, step 72 clears the snapshot map and step 74 clears the snapshot storage as previously described. Execution in FIG. 4 then returns to the start and await further processing.

At this point, a write request arrives at mass storage read/write processing block 42 requesting that data blocks 144 of FIG. 8A be stored in storage locations 138. Because this is a write request, execution proceeds through decision blocks 66, 76, and 78 to decision block 82 of FIG. 4. A snapshot having been taken at time $T_1$, as indicated in FIGS. 8A and 8B, execution proceeds to decision block 84. So far, this is identical to the processing described with reference to FIGS. 7A and 7B.

Decision block 84 determines whether the data stored in the storage locations that are to be overwritten have been previously stored in snapshot storage. In this example, data blocks 144 are to be stored in storage locations 1 and 3. Since storage locations 1 and 3 have not yet been placed in snapshot storage, the process executes decision block 85 to distinguish between desirable and undesirable data blocks for backup. Since data block 3 of protection map locations 129 in FIG. 8A is marked as undesirable for backup, execution proceeds from decision block 85 to step 88, skipping step 86. Data block 3b of storage locations 138 is not copied to the snapshot storage 22. However, data block 1 of protection map locations 129 is identified as desirable for backup and therefore is marked as protected (i.e., data block 1 is not marked to be unprotected). Therefore, when data block 1 is processed, execution proceeds from decision block 85 to step 86, and data block 1 of storage locations 138 is copied to snapshot storage 22. In FIG. 8A, this is illustrated by snapshot storage 22 containing data block 1, referenced as 146. As stated above, insuring that snapshot storage 22 contains only protected data blocks is the difference between the embodiment of FIGS. 7A and 7B and the embodiment of FIGS. 8A and 8B.

After data block 1 has been preserved in snapshot storage 22, the new data blocks are written to the original data in step 88. Returning to FIG. 8A, this means that data blocks 1a and 3c are written into storage locations 138 in order to produce storage locations 150 where data block 1a has overwritten data block 1 and data block 3c has overwritten data block 3b. Step 90 of FIG. 5 then states that the data blocks need to be identified as modified. Thus, map locations 152 of snapshot map 52 are modified to indicate that storage location 1 and storage location 3 have new data stored therein. A write request response is then returned as directed by step 92 of FIG. 4.

At this point, the embodiment depicted in FIGS. 8A and 8B proceeds by operating just as the embodiment shown in FIGS. 7A and 7B. Returning to FIG. 5, the snapshot was taken at time $T_1$ by mass storage read/write processing block 42 of FIG. 3 as directed by step 102 of FIG. 5. Steps 104 and 106 then indicate that the data blocks that were changed before the snapshot was taken should then be assembled and sent to the snapshot copy. The data blocks that should be transferred are indicated by the information contained in backup map 48 and protection map 53.

Returning to FIG. 8A, map locations 142 of backup map 48 indicate that storage locations 3, 4, and 6 have been changed prior to the snapshot taken at time $T_1$. An examination of snapshot locations 152 indicates that data blocks 4 and 6 are on the mass storage system and that data block 3 will be in the snapshot storage 22 if it is marked as protected. (However, as described above, since data block 3 is marked in map locations 129 as not being protected, data block 3 is not stored in snapshot storage 22.) Step 104 of FIG. 5 then requests that data blocks stored in storage locations 3, 4 and 6 be retrieved by backup read processing block 56 of FIG. 3.

Backup read processing block 56 processes these requests received from primary backup processing block 54 as illustrated in FIG. 6. The request is for the data blocks stored in storage locations 3, 4, and 6. With regard to the data block stored in storage location 3, decision block 113 determines that this data block is marked to be unprotected and the data block is therefore not returned in step 120. Since the data blocks stored in locations 4 and 6 are not marked to be unprotected, decision block 114 of FIG. 6 then retrieves the data blocks stored in storage locations 4 and 6 from the original device in step 118 and returns them to primary backup processing block 54 in step 120. This process is illustrated graphically in FIG. 8A where data blocks 153 are assembled by retrieving data blocks 4b and 6a from storage locations 150. Data blocks 153 are then transferred to the snapshot copy, via mass storage read write processing 42. The data blocks 153 are then applied to storage locations 124 to achieve storage locations 154. Storage locations 154 are identical to storage locations 138 of the primary system (FIG. 8A) with the exception of storage location 3 since it was identified as undesirable for backup. Recall that storage locations 138 represented the state of mass storage device 20 at time $T_1$ when the snapshot was taken. Thus, the changes that have occurred between time $T_0$ and time $T_1$ have now been backed up to the snapshot copy 16 in order to bring snapshot copy current with original data at time $T_1$.

Returning now to FIG. 8A, suppose that data blocks 156 are now to be written to storage locations 150. The writing of data blocks 156 causes a change to the data blocks stored in storage locations 1, 4, and 6. Mass storage read/write processing block 42 handles the write of the data blocks to be stored in locations 4 and 6 as previously described with the data blocks 144 stored in those locations after time $T_1$ (data block 4b and data block 6a being stored in snapshot storage 22). New data blocks 4c and 6b are then written to the original data 14.

With regard to the data block that is to be stored in storage location 1, execution proceeds in FIG. 4 down to decision block 84. Recall this decision block tests whether the data block stored in the storage location at the time that the snapshot was taken has previously been preserved in the snapshot storage. The data block stored in storage location 1 has been previously preserved in snapshot storage 22 as indicated by data block 146 of FIG. 8A. Thus, FIG. 4 indicates that step 86 is skipped and the new data is simply written to the original data. In FIG. 8A, this results in data block 1b replacing data block 1a so that data block 1a is lost. When data blocks 156 are applied to storage locations 150, storage locations 158 result. Map locations 152 are then updated to indicate that the storage locations that have been changed since time $T_1$ now include storage locations 4 and 6 in addition to storage locations 1 and 3. This is illustrated in FIG. 8A by map locations 160 of snapshot storage 52.

Assume that a second backup is now to be made of mass storage device 20. In this case, the backup is made as previously described in FIG. 5, where execution proceeds to step 100 where a logically consistent state is identified. In FIG. 8A, assume this logically consistent state was identified at time $T_2$. Step 102 of FIG. 5 then signals a snapshot to be taken at time $T_2$. As previously described in conjunction with the snapshot taken at time $T_1$, mass storage read/write processing block 42 receives a snapshot request, such as snapshot request 68 of FIG. 3, and copies the snapshot map to the backup map in step 70. This is indicated in FIG. 8A where map locations 162 of backup map 48 are changed to be the same as map locations 160 of snapshot map 52.

Steps 72 and 74 of FIG. 4 then indicate that the snapshot map and snapshot storage should be cleared. In FIG. 8A, the snapshot map is cleared as indicated by map locations 164 of snapshot map 52. Snapshot storage 22, however, still shows data blocks stored therein. This is to illustrate that the data blocks may still physically reside in snapshot storage 22 as long as the index to snapshot storage 22 is cleared so that snapshot storage 22 appears to contain no data blocks.

Assuming that no data blocks are within storage locations 158 after the snapshot taken at time $T_2$, data blocks 166 are read from storage locations 158 according to the process described in FIG. 6. Note that location 3 of storage locations 158 is not read because decision block 113 of FIG. 5 uses protection map locations 129 to determine that location 3 is not protected. Therefore, data block 3c is not read and transferred to the backup system. The data blocks that are read are then assembled and sent to the snapshot copy via mass storage read/write processing block 42 as illustrated in steps 104 and 106 of FIG. 5. The data blocks 166 are applied to storage locations 154 in order to arrive at storage locations 168, which are an identical copy of storage locations 158 of the original data (FIG. 8A) except for storage location 3 since it was identified user as being undesirable for backup.

As described herein, only those data blocks that have changed and are designated to be protected are backed up. In step 85 of FIG. 4, if a data block is not designated to be protected, the data block may be simply written over without writing the original data block to snapshot storage; thus, conserving snapshot storage memory. Also, since data blocks are only transmitted to the backup system if they are designated as protected, less data has to be transmitted to the backup system resulting in faster backup times.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system having a mass storage device that stores data blocks, a method of creating a snapshot copy of selected data blocks, comprising the acts of:
    designating first data blocks of the mass storage device to be included in a snapshot copy that is to preserve the designated first data blocks as the designated first data blocks existed at a first point in time;
    marking second data blocks of the mass storage device as not protected so as to exclude the second data blocks from the snapshot copy;
    ensuring that the designated first data blocks are in a logically consistent state such that the first point in time corresponds to a time when no activity exists on the mass storage device;
    as the designated first data blocks at the mass storage device change after the first point in time, identifying specific data blocks of the designated first data blocks that change at the mass storage device;
    preserving a copy of only the specific data blocks of the designated first data blocks that change and not a copy of the data blocks of the second data blocks that change, wherein the preserved copy of the changed designated data blocks represents an original copy of the changed data blocks of the designated first data blocks prior to changing;
    backing up the designated first data blocks to the snapshot copy without interrupting access to the mass storage device; and
    providing access to the snapshot copy of the designated first data blocks.

2. The method of claim 1, wherein the snapshot copy is created without disrupting user access to the designated first data blocks to the extent that users are able to continue to issue I/O requests to the mass storage device as the snapshot copy is created.

3. The method of claim 1, wherein the act of identifying the specific data blocks of the designated first data blocks that change at the mass storage device comprises the act of maintaining a table that includes an entry for at least the specific data blocks that have changed after the first point in time.

4. The method of claim 1, further comprising the act of maintaining the snapshot copy as a backup of the designated first data blocks as the designated first data blocks existed at the first point in time.

5. The method of claim 1, further comprising the act of restoring the designated first data blocks using the snapshot copy after experiencing data loss at the mass storage system after the first point in time.

6. The method of claim 1, wherein the snapshot copy includes:
    the preserved copy of the changed data blocks for those data blocks of the designated first data blocks that have changed; and
    original copies of those data blocks of the designated first data blocks that have not changed after the first point in time.

7. The method of claim 6, further comprising the act of creating a second snapshot copy of the designated first data blocks as the designated first data blocks existed at a second point in time, including:
    as the data blocks at the mass storage device change after the second point in time, and in response to the information, identifying the data blocks of the designated first data blocks that change at the mass storage device;
    preserving a copy of only the specific data blocks of the designated first data blocks that change after the second point in time and not a copy of the data blocks of the second data blocks that change after the second point in time, wherein the copy of the changed designated data blocks represents an original copy of the data blocks of the designated first data blocks prior to changing after the second point in time; and providing access to the second snapshot copy of the designated first data blocks, wherein the second snapshot copy includes:

the preserved copy of the changed data blocks for those data blocks of the designated first data blocks that have changed after the second point in time; and original copies of those data blocks of the designated first data blocks that have not changed after the second point in time.

8. The method of claim 1, wherein the act of providing access to the snapshot copy comprises the act of permitting a user to change data blocks of the snapshot copy, such that the snapshot copy represents a changed version of the designated first data blocks.

9. The method of claim 1, wherein the act of providing access to the snapshot copy comprises the act of enabling read access to the snapshot copy.

10. The method of claim 1, wherein the act of providing access to the snapshot copy is performed while providing ongoing access to the first data blocks and the second data blocks stored in the mass storage device.

11. The method of claim 1, wherein the act of preserving a copy of only the specific data blocks of the designated first data blocks that change is performed by preserving a copy of the data blocks of the designated first data blocks only in response to a first change thereof after the first point in time and not in response to any subsequent changes.

12. In a computer system having a mass storage device that stores data blocks, a method of restoring data of the mass storage device using a snapshot copy of selected data blocks, comprising the acts of:

marking the data blocks such that a first subset of data blocks are marked as desirable for backup and a second subset of data blocks are marked as being undesirable for backup;

as the data blocks at the mass storage device change after a first point in time, identifying the data blocks of the first subset that change at the mass storage device;

preserving only a copy of the data blocks of the first subset that change and not a copy of the data blocks of the second subset that change, wherein the copy of the changed data blocks represents an original copy of the changed data blocks of the first subset prior to changing;

maintaining a snapshot copy of the first subset of the data blocks stored in the mass storage device, the snapshot copy preserving the first subset of the data blocks as the first subset existed at the first point in time without preserving the second subset of the data blocks that are marked as being undesirable for backup in the snapshot copy and wherein the snapshot copy is created at a time when the first subset of the data blocks is in a logically consistent state such that no activity is present on the mass storage device, wherein the snapshot copy includes:

preserved copies of those data blocks of the first subset of the data blocks that have changed at the mass storage device after the first point in time; and original copies of those data blocks of the first subset of the data blocks that have not changed after the first point in time;

experiencing loss of at least some of the first subset of the data blocks at the mass storage device after the first point in time; and restoring the first subset of the data blocks of the mass storage device using the snapshot copy.

13. The method of claim 12, wherein the first subset has been selected by a user of the computer system.

14. The method of claim 12, wherein the act of restoring the first data blocks comprises the act of restoring the first data blocks to the state in which they existed at the first point in time.

15. The method of claim 12, wherein the act of experiencing loss of at least some of the first data blocks comprises the acts of:

experiencing a condition that results in corruption of at least some of the first subset of data blocks; and prior to the corruption of the at least some of the first subset of data blocks, preserving a copy of the at least some of the first subset, wherein the copy of the changed data blocks represents an original copy of the at least some of data blocks.

16. The method of claim 12, further comprising the act of maintaining one or more other snapshot copies of the first subset of the data blocks as they existed at the mass storage device at other points in time after the first point in time.

17. In a computer system having a mass storage device that stores data blocks, a method of providing users access to a snapshot copy of selected data blocks while providing ongoing access to the data blocks stored on the mass storage device, comprising the acts of:

receiving an instruction to create a snapshot copy of selected data blocks on a mass storage device, wherein second data blocks are marked as unprotected and excluded from the instruction to create a snapshot copy;

ensuring that the selected data blocks are in a logically consistent state such that no activity is present regarding at least the selected data blocks;

as the data blocks at the mass storage device change after a first point in time, identifying the data blocks of the selected data blocks that change at the mass storage device;

preserving only a copy of the data blocks of the selected data blocks that change and not a copy of the data blocks of the second data blocks that change, wherein the copy of the changed data blocks represents an original copy of the changed data blocks of the selected data blocks prior to changing;

maintaining the snapshot copy of the selected data blocks stored in the mass storage device without interrupting access to the mass storage device, the snapshot copy preserving the selected data blocks as the selected data blocks existed at the first point in time, wherein the snapshot copy includes:

preserved copies of those data blocks of the selected data blocks that have changed at the mass storage device after the first point in time; and original copies of those data blocks of the selected data blocks that have not changed after the first point in time;

providing access to the snapshot copy of the selected data blocks, such that changes to the snapshot copy do not change the selected data blocks stored on the mass storage device; and while providing access to the snapshot copy, providing access to the selected data blocks stored on the mass storage device, such that changes to the selected data blocks stored on the mass storage device do not change the snapshot copy.

18. The method of claim 17, wherein the selected data blocks are selected by a user of the computer system.

19. The method of claim 17, wherein the act of providing access to the snapshot copy comprises the act of providing write access to the snapshot copy by which the data blocks of the snapshot copy can be changed.

20. The method of claim 17, further comprising the act of maintaining one or more other snapshot copies of the selected data blocks as they existed at the mass storage device at other points in time after the first point in time.

21. In a computer system having a mass storage device that stores data blocks, a method of creating multiple snapshot copies of selected data blocks, comprising:
  marking a first designated subset of data blocks as protected and marking a second subset of data blocks as unprotected;
  as the data blocks at the mass storage device change after a first point in time, identifying the data blocks of the first designated subset that change at the mass storage device;
  preserving only a copy of the data blocks of the first designated subset that change and not a copy of the data blocks of the second subset that change, wherein the copy of the changed designated data blocks represents an original copy of the changed data blocks of the first designated subset prior to changing;
  maintaining a first snapshot copy of a first designated subset of the data blocks stored in the mass storage device, the snapshot copy preserving the first designated subset of the data blocks as the first designated subset existed at the first point in time without preserving second subset of data blocks that have been marked as unprotected, wherein the first snapshot copy is created at a first time when the designated subset of data blocks is in a logically consistent state such that no activity is present in the mass storage device and wherein a particular subset of the data blocks stored in the mass storage device are not designated for backup in the snapshot copy, wherein the first snapshot copy includes:
    preserved copies of those data blocks of the subset of first designated data blocks that have changed at the mass storage device after the first point in time; and
    original copies of those data blocks of the first designated subset of the data blocks that have not changed after the first point in time; and
  as the data blocks at the mass storage device change after a second point in time, identifying the data blocks of the first designated subset that change at the mass storage device;
  preserving only a copy of the data blocks of the first designated subset that change and not a copy of the data blocks of the second subset that change, wherein the copy of the changed designated data blocks represents an original copy of the changed data blocks of the first designated subset after the first point in time prior to changing;
  maintaining a second snapshot copy of a second designated subset of the data blocks stored in the mass storage device, the snapshot copy preserving the second designated subset of the data blocks as the designated subset existed at the second point in time without preserving the second subset of data blocks, wherein the second snapshot copy is created at a second time when the designated subset of data blocks is in a logically consistent state such that no activity is present in the mass storage device and wherein another subset of data blocks stored in the mass storage device are excluded from backup in the second snapshot copy, wherein the second snapshot copy includes:
    preserved copies of those data blocks of the second designated subset of the data blocks that have changed at the mass storage device after the second point in time; and
    original copies of those data blocks of the second designated subset of the data blocks that have not changed after the second point in time; and
  continuing to provide access to the mass storage device while maintaining the first and second snapshot copy.

22. The method of claim 21, wherein the first designated subset and the second designated subset are selected by a user of the computer system.

23. The method of claim 21, further comprising the act of providing access to the first snapshot copy of the first designated subset of the data blocks while independently providing access to the data blocks stored on the mass storage device.

24. The method of claim 21, wherein the first period of time is different from the second period of time.

25. The method of claim 21, wherein the first designated subset of the data blocks is different from the second designated subset of the data blocks.

26. The method of claim 21, farther comprising the act of maintaining the first and second snapshot copies as backups of the first and second designated subsets of the data blocks, respectively.

27. The method of claim 21, farther comprising the act of restoring the first designated subset of the data blocks using the first snapshot copy after experiencing data loss at the mass storage system.

28. In a computer system having a mass storage device that stores data blocks and has access to a data storage location that contains a snapshot copy of the data blocks, a method of backing up the data blocks in the snapshot copy, the method comprising:
  marking first data blocks to include in a snapshot copy of a mass storage device using a protection map and marking second data blocks to exclude from the snapshot copy of the mass storage device using the protection map;
  initiating the creation of a snapshot copy of the first data blocks stored on a mass storage device at a first time when the data blocks are in a logically consistent state on the mass storage device, wherein the snapshot copy initially contains the first data blocks that are identical to the first data blocks at a time prior to the first time;
  during a time period between the first time and a second time, only tracking changes to the first data blocks of the mass storage device so as to identify which data blocks of the first data blocks change in the time period while continuing to provide access to the mass storage device; and
  at the second time when the data blocks are in a logically consistent state, initiating an update of the snapshot copy by transmitting only those data blocks of the first data blocks that have changed during the time period between the first time and the second time to the snapshot copy such that the snapshot copy includes a copy of the first data blocks as the data blocks existed on the mass storage device at the second time without interrupting access to the mass storage device.

* * * * *

UNITED STATES PATENT AND TRADEMARK OFFICE
CERTIFICATE OF CORRECTION

PATENT NO.        : 7,296,125 B2
APPLICATION NO. : 09/997643
DATED             : November 13, 2007
INVENTOR(S)       : Richard S. Ohran It is certified that error appears in the above-identified patent and that said Letters Patent is hereby corrected as shown below:

Column 1
Line 61, "performed by operating…" change to --performed by the operating--

Column 2
Line 51/52, remove "that"

Column 6
Line 61, remove "is"

Column 8
Line 33, remove "is"

Column 12
Line 11/12, change "it preferred" to --it is preferred--
Line 58, change "4" to --3--

Column 15
Line 33, change "104" to --106--
Line 36/37 - There should not be a new paragraph started here -

Column 17
Line 12, remove "24"
Line 13, remove "24"

Column 18
Line 39, change "5" to --4--

Column 19
Line 66, change "an" to --and--

Column 21
Line 61, change "5" to --4--

Column 26
Line 18, change "some of data…" to --some of the data…--

UNITED STATES PATENT AND TRADEMARK OFFICE
CERTIFICATE OF CORRECTION

PATENT NO. : 7,296,125 B2
APPLICATION NO. : 09/997643
DATED : November 13, 2007
INVENTOR(S) : Richard S. Ohran It is certified that error appears in the above-identified patent and that said Letters Patent is hereby corrected as shown below:

<u>Column 27</u>
Line 29/30, change "preserving second…" to --preserving the second--

<u>Column 28</u>
Line 25, change "farther" to --further--
Line 29, change "farther" to --further--

Signed and Sealed this

Fourteenth Day of October, 2008

JON W. DUDAS
*Director of the United States Patent and Trademark Office*